US012423951B2

(12) United States Patent
Back et al.

(10) Patent No.: US 12,423,951 B2
(45) Date of Patent: Sep. 23, 2025

(54) SERVER FOR CLASSIFYING IMAGE AND OPERATING METHOD THEREOF

(71) Applicant: Samsung Electronics Co., Ltd., Suwon-si (KR)

(72) Inventors: Seohyun Back, Suwon-si (KR); Taeho Kil, Suwon-si (KR); Gyubin Son, Suwon-si (KR); Hyunsoo Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 391 days.

(21) Appl. No.: 18/159,976

(22) Filed: Jan. 26, 2023

(65) Prior Publication Data
US 2023/0245424 A1  Aug. 3, 2023

Related U.S. Application Data

(63) Continuation of application No. PCT/KR2023/000805, filed on Jan. 17, 2023.

(30) Foreign Application Priority Data

Jan. 28, 2022 (KR) .................. 10-2022-0013614

(51) Int. Cl.
*G06V 10/764* (2022.01)
*G06F 16/28* (2019.01)
(Continued)

(52) U.S. Cl.
CPC .......... *G06V 10/765* (2022.01); *G06F 16/285* (2019.01); *G06F 16/35* (2019.01);
(Continued)

(58) Field of Classification Search
CPC .. G06V 10/765; G06V 10/26; G06V 10/7715; G06V 10/82; G06V 10/44;
(Continued)

(56) References Cited

U.S. PATENT DOCUMENTS 8,478,052 B1  7/2013  Yee et al.
9,721,190 B2  8/2017  Vijayanarasimhan et al.
(Continued)

FOREIGN PATENT DOCUMENTS

KR  10-2019-0016367 A  2/2019
KR  10-2019-0080818 A  7/2019
(Continued)

OTHER PUBLICATIONS

Cao et al., Improved MLP-Mixer for Cars' Type Recognition, Aug. 15-17, 2022 [retrieved Apr. 12, 2025], 2022 34th Chinese Control and Decision Conference, pp. 6040-6045. DOI: 10.1109/CCDC55256.2022.10033636 (Year: 2022).*

(Continued)

*Primary Examiner* — Henok Shiferaw
*Assistant Examiner* — Dennis Rosario
(74) *Attorney, Agent, or Firm* — Jefferson IP Law, LLP

(57) ABSTRACT

A server for classifying an image and a method of operating the server are provided. The method includes obtaining classification probability values of the image, by applying the image to an image classification model including a plurality of parallel multi-layer perceptron (MLP) layers, and classifying the image, based on the classification probability values, wherein each of the plurality of parallel MLP layers includes a first MLP and a second MLP, an operation using the first MLP and an operation using the second MLP are performed in parallel, and dimensions of data before and after an operation of each of the plurality of parallel MLP layers are same by combining an operation result of the first MLP with an operation result of the second MLP.

20 Claims, 17 Drawing Sheets

(51) Int. Cl.

| | |
|---|---|
| *G06F 16/35* | (2025.01) |
| *G06F 16/906* | (2019.01) |
| *G06F 18/24* | (2023.01) |
| *G06F 18/241* | (2023.01) |
| *G06F 18/2415* | (2023.01) |
| *G06N 3/02* | (2006.01) |
| *G06N 3/04* | (2023.01) |
| *G06N 3/045* | (2023.01) |
| *G06N 3/0464* | (2023.01) |
| *G06N 3/047* | (2023.01) |
| *G06N 7/01* | (2023.01) |
| *G06T 3/4046* | (2024.01) |
| *G06T 5/00* | (2024.01) |
| *G06T 5/60* | (2024.01) |
| *G06T 7/60* | (2017.01) |
| *G06T 7/62* | (2017.01) |
| *G06V 10/26* | (2022.01) |
| *G06V 10/77* | (2022.01) |
| *G06V 10/82* | (2022.01) |
| *G06V 20/69* | (2022.01) |
| *G06V 30/19* | (2022.01) |
| *G06V 40/16* | (2022.01) |

(52) U.S. Cl.
CPC ............ *G06F 16/906* (2019.01); *G06F 18/24* (2023.01); *G06F 18/241* (2023.01); *G06F 18/2415* (2023.01); *G06N 3/02* (2013.01); *G06N 3/04* (2013.01); *G06N 3/045* (2023.01); *G06N 3/0464* (2023.01); *G06N 3/047* (2023.01); *G06N 7/01* (2023.01); *G06T 3/4046* (2013.01); *G06T 5/00* (2013.01); *G06T 5/60* (2024.01); *G06T 7/60* (2013.01); *G06T 7/62* (2017.01); *G06V 10/26* (2022.01); *G06V 10/764* (2022.01); *G06V 10/7715* (2022.01); *G06V 10/82* (2022.01); *G06V 20/698* (2022.01); *G06V 30/19173* (2022.01); *G06V 40/172* (2022.01); *G06F 2218/12* (2023.01); *G06T 2207/20084* (2013.01)

(58) Field of Classification Search
CPC .... G06V 10/454; G06V 10/46; G06V 10/764; G06V 10/84; G06V 20/698; G06V 30/19173; G06V 40/172; G06T 2207/20081; G06T 2207/20084; G06T 3/4046; G06T 5/60; G06T 5/00; G06T 7/62; G06T 7/60; G06T 2207/2008; G06N 3/0464; G06N 3/045; G06N 3/04; G06N 3/047; G06N 7/01; G06N 3/02; G06F 18/24; G06F 18/241; G06F 18/2415; G06F 2218/12; G06F 16/35; G06F 16/285; G06F 16/906
See application file for complete search history.

(56) References Cited

U.S. PATENT DOCUMENTS

| | | | |
|---|---|---|---|
| 10,223,611 | B1 | 3/2019 | Price et al. |
| 10,740,593 | B1 | 8/2020 | Kim et al. |
| 10,937,141 | B2 | 3/2021 | Song et al. |
| 11,074,711 | B1 | 7/2021 | Akbas et al. |
| 11,216,694 | B2 | 1/2022 | Jung et al. |
| 2016/0086078 | A1* | 3/2016 | Ji ................... G06V 30/19173 382/157 |
| 2020/0327377 | A1 | 10/2020 | Jaganathan et al. |
| 2021/0150721 | A1 | 5/2021 | Yohanandan et al. |
| 2021/0256322 | A1 | 8/2021 | Lee et al. |
| 2021/0264266 | A1 | 8/2021 | Dutta et al. |
| 2022/0004858 | A1 | 1/2022 | Lee et al. |

FOREIGN PATENT DOCUMENTS

| | | |
|---|---|---|
| KR | 10-2020-0010629 A | 1/2020 |
| KR | 10-2078133 B | 2/2020 |
| KR | 10-2020-0107499 A | 9/2020 |
| KR | 10-2020-0111948 A | 10/2020 |
| KR | 10-2021-0104299 A | 8/2021 |

OTHER PUBLICATIONS

Wang et al., A Personalized Recommendation System based on Knowledge Graph Embedding and Neural Network, Oct. 11-12, 2019 [retrieved Apr. 12, 2025], 2019 3rd International Conference on Data Science and Business Analytics, pp. 161-165. DOI: 10.1109/ICDSBA48748.2019.00042 (Year: 2019).*
Sekikawa et al., EventNet: Asynchronous Recursive Event Processing, Apr. 1, 2019 [retrieved Apr. 12, 2025], Cornell University: arXiv, version: [v2], 10 pages. https://doi.org/10.48550/arXiv.1812.07045 (Year: 2019).*
Qi et al., PointNet: Deep Learning on Point Sets for 3D Classification and Segmentation, Apr. 10, 2017 [retrieved Apr. 12, 2025], Cornell University:arXiv, version [v2], 19 pages. https://doi.org/10.48550/arXiv.1612.00593 (Year: 2017).*
Wang et al., VoxSegNet: Volumetric CNNs for Semantic Part Segmentation of 3D Shapes, Jan. 30, 2019 [retrieved Apr. 12, 2025], IEEE Transactions on Visualization and Computer Graphics, vol. 26: Issue: 9: Sep. 1, 2020, pp. 2919-2930. DOI: 10.1109/TVCG.2019.2896310 (Year: 2019).*
Pegoraro et al., Real-Time People Tracking and Identification From Sparse mm-Wave Radar Point-Clouds, May 26, 2021 [retrieved Apr. 12, 2025], IEEE Access, vol. 9, pp. 78504-78520. DOI: 10.1109/ACCESS.2021.3083980 (Year: 2021).*
Zambaldi et al., Relational Deep Reinforcement Learning, Jun. 28, 2018 [retrieved Jul. 26, 2025], Cornell University: arXiv, version [v2], pp. 1-15. https://doi.org/10.48550/arXiv.1806.01830 (Year: 2018).*
Jinhui et al., No-Reference Stereoscopic Image Quality Assessment Considering Binocular Disparity and Fusion Compensation, Dec. 5-8, 2021 [retrieved Jul. 26, 2025], 2021 International Conference on Visual Communications and Image Processing (VCIP), 5 pages. https://doi.org/10.1109/VCIP53242.2021.9675398 (Year: 2021).*
Rosenblatt, the Perceptron: a Probabilistic Model for Information Storage and Organization in the Brain, 1958 [retrieved Jul. 29, 2025], Psychologial Review, vol. 65, No. 6, pp. 386-408. Retrived: https://blog.waqasrana.me/assets/papers/rosenblatt1958.pdf (Year: 1958).*
International Search Report dated Apr. 28, 2023, issued in International Patent Application No. PCT/KR2023/000805.
Luke Melas-Kyriazi, Do You Even Need Attention? A Stack of Feed-Forward Layers Does Surprisingly Well on ImageNet, May 6, 2021.
Yongming Rao et al., Global Filter Networks for Image Classification, Oct. 26, 2021.
Hugo Touvron et al., ResMLP: Feedforward networks for image classification with data-efficient training, Jun. 10, 2021.
Ilya Tolstikhin et al., MLP-Mixer: An all-MLP Architecture for Vision, Jun. 11, 2021.
Hanxiao Liu et al., Pay Attention to MLPs, Jun. 1, 2021.
George Cazenavette et al., MixerGAN: An MLP-Based Architecture for Unpaired Image-to-Image Translation, Aug. 19, 2021.
Bailing Zhang, Reliable Classification of Vehicle Types Based on Cascade Classifier Ensembles, IEEE Transactions on Intelligent Transportation Systems, vol. 14, No. 1, Mar. 1, 2013, XP011495819.
Garcia-Salgado Beatriz P. et al., Parallel Multilayer Perceptron Neural Network Used for Hyperspectral Image Classification, Real-Time Image and Video Processing 2016, vol. 9897, Apr. 29, 2016, XP093233126.
European Search Report dated Dec. 23, 2024, issued in European Application No. 23747237.8.

* cited by examiner

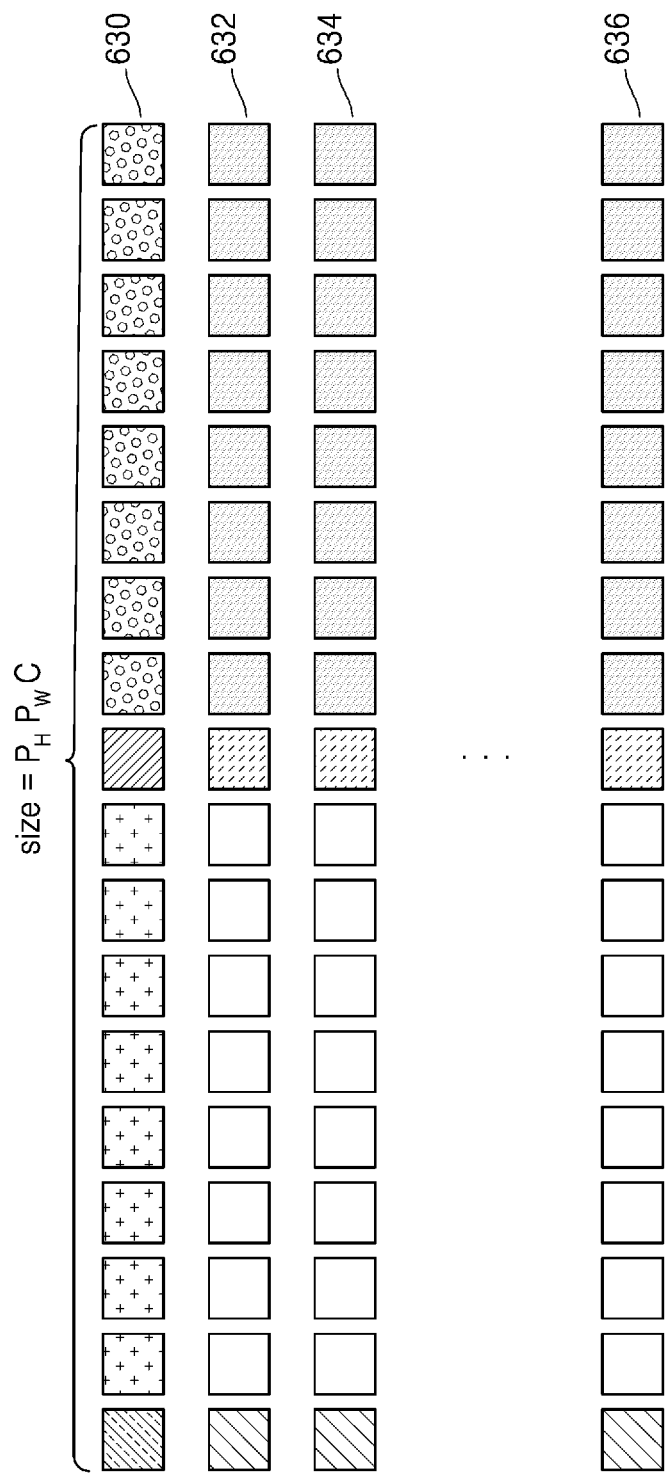

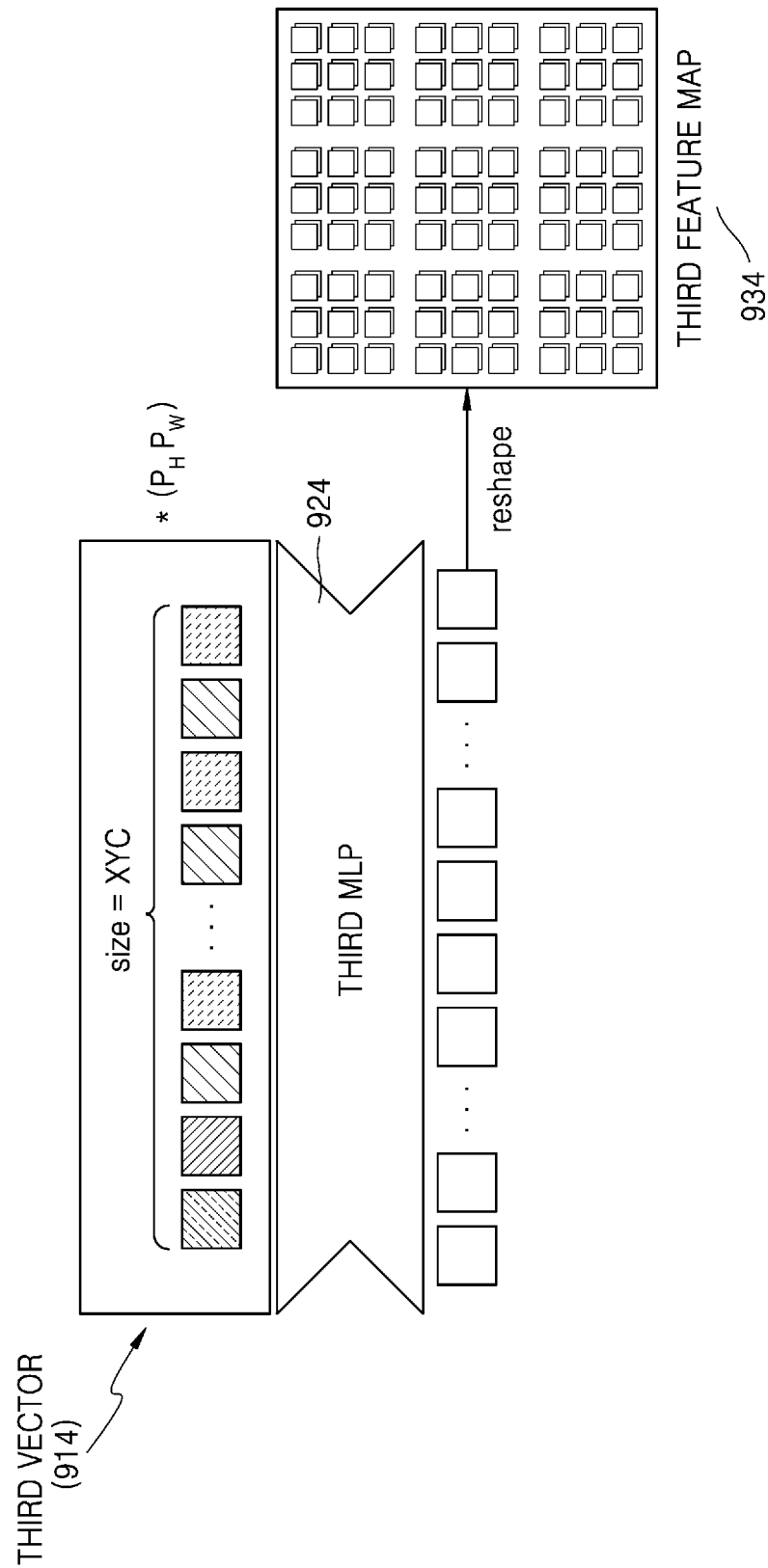

SERVER FOR CLASSIFYING IMAGE AND OPERATING METHOD THEREOF

CROSS-REFERENCE TO RELATED APPLICATION(S)

This application is a continuation application, claiming priority under § 365(c), of an International application No. PCT/KR2023/000805, filed on Jan. 17, 2023, which is based on and claims the benefit of a Korean patent application number 10-2022-0013614, filed on Jan. 28, 2022, in the Korean Intellectual Property Office, the disclosure of which is incorporated by reference herein in its entirety.

TECHNICAL FIELD

The disclosure relates to a server classifying an image by using an image classification model, and an operating method of the server.

BACKGROUND ART

A variety of technologies for classifying an image are used in the field of computer vision. For example, various image processing technologies such as convolutional neural network (CNN) and vision transformer (ViT) have been developed, and a technology for patching an image using a multi-layer perceptron (MLP) and processing the image based on image patch has been recently used.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an image classification model that operates based on an image patch using a multi-layer perceptron (MLP), processes elements included in the image patch into vectors in various ways, inputs the processed vectors from a plurality of MLPs, respectively, and performs operations by the plurality of MLPs in parallel.

Another aspect of the disclosure is to provide a server using an image classification model capable of classifying an image with improved speed and accuracy, and an operating method of the server, by using the image classification model including a plurality of MLPs that perform operations in a parallel structure.

Additional aspects will be set forth in part in the description which follows and, in part, will be apparent from the description, or may be learned by practice of the presented embodiments.

Technical Solution to Problem

In accordance with an aspect of the disclosure, a method, performed by a server, of classifying an image is provided. The method includes obtaining classification probability values of the image, by applying the image to an image classification model including a plurality of parallel multi-layer perceptron (MLP) layers, and classifying the image, based on the classification probability values, wherein each of the plurality of parallel MLP layers includes a first MLP and a second MLP, an operation using the first MLP and an operation using the second MLP are performed in parallel, and dimensions of data before and after an operation of each of the plurality of parallel MLP layers are the same by combining an operation result of the first MLP with an operation result of the second MLP.

An operation of a first parallel MLP layer that is an initial parallel MLP layer among the plurality of parallel MLP layers includes receiving image patches, as an input, obtained by splitting the image, obtaining a first feature map by using the first MLP in the first parallel MLP layer for learning a local characteristic of each of the image patches, obtaining a second feature map by using the second MLP in the first parallel MLP layer for learning a relationship between the image patches, generating an output feature map based on the first feature map and the second feature map, and transferring the output feature map to a second parallel MLP layer that is a next parallel MLP layer.

Also, a dimension of the first feature map may be the same as a dimension of the second feature map.

The generating of the output feature map includes applying an attention weight to each of the first feature map and the second feature map and adding the first feature map and the second feature map to which the attention weight is applied.

The first MLP and the second MLP each includes an active function layer and one or more fully connected layers.

The obtaining of the first feature map by using the first MLP in the first parallel MLP layer for learning the local characteristic of each of the image patches includes obtaining first vectors, in which all pixels in multi-channel image patches are linearly embedded, of the image with respect to each of the multi-channel image patches and applying the first vectors to the first MLP.

The obtaining of the second feature map by using the second MLP in the first parallel MLP layer for learning the relationship between the image patches includes obtaining second vectors, in which pixels at the same location are linearly embedded in each of the image patches of the same channel, of the image and applying the second vectors to the second MLP.

Each of the plurality of parallel MLP layers further includes a third MLP, and the third MLP may perform operations in parallel with the first MLP and the second MLP.

The operation of the initial parallel MLP layer among the plurality of parallel MLP layers includes obtaining a third feature map by using a third MLP for learning the relationship between the image patches by reflecting channel information of the image, and the generating of the output feature map of the initial parallel MLP layer includes generating the output feature map, based on the first feature map, the second feature map, and the third feature map.

The obtaining of the third feature map by using the third MLP for learning the relationship between the image patches by reflecting the channel information of the image includes identifying pixels, of the image in each of the multi-channel image patches, at the same location in the multi-channel image patches, obtaining third vectors in which the identified pixels are linearly embedded, and applying the third vectors to the third MLP.

In accordance with another aspect of the disclosure, a server for classifying an image is provided. The server includes a communication interface, a memory storing one or more instructions, and a processor configured to execute the one or more instructions stored in the memory to obtain classification probability values of the image, by applying the image to an image classification model including a plurality of parallel multi-layer perceptron (MLP) layers, and classify the image, based on the classification probability values, wherein each of the plurality of parallel MLP layers includes a first MLP and a second MLP, an operation using the first MLP and an operation using the second MLP are performed in parallel, and dimensions of data before and after an operation of each of the plurality of parallel MLP layers are the same by combining an operation result of the first MLP and an operation result of the second MLP.

In accordance with another aspect of the disclosure, a computer program stored in a computer-readable recording medium, configured to perform a method of classifying an image by using an image classification model is provided. The image classification model includes a plurality of parallel multi-layer perceptron (MLP) layers, the plurality of parallel MLP layers including an input parallel MLP layer, one or more hidden parallel MLP layers and an output parallel MLP layer, and each of the plurality of parallel MLP layers including a first MLP and a second MLP, wherein the method of classifying the image includes generating a plurality of image patches by splitting the image, generating first vectors for recognizing a local characteristic of each of the image patches, generating second vectors for recognizing a characteristic of a relationship between the image patches, inputting the first vectors to the first MLP in the input parallel MLP layer, inputting the second vectors to the second MLP in the input parallel MLP layer, and performing an operation of the first MLP in the input parallel MLP layer and an operation of the second MLP in the input parallel MLP layer in parallel, extracting features related to the image, by using the one or more hidden parallel MLP layers, and outputting a classification probability value of the image from the features related to the image, by using the output parallel MLP layer.

According to an aspect of the disclosure, a computer readable recording medium having recorded thereon a program for executing any one of the methods, performed by a server, of classifying an image is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 6B is a diagram illustrating an operation of a server generating first vectors by using an image classification model according to an embodiment of the disclosure;

FIG. 9A is a diagram illustrating an operation of a third MLP according to an embodiment of the disclosure;

Throughout the drawings, it should be noted that like reference numbers are used to depict the same or similar elements, features, and structures.

MODE OF DISCLOSURE

Figure 1:
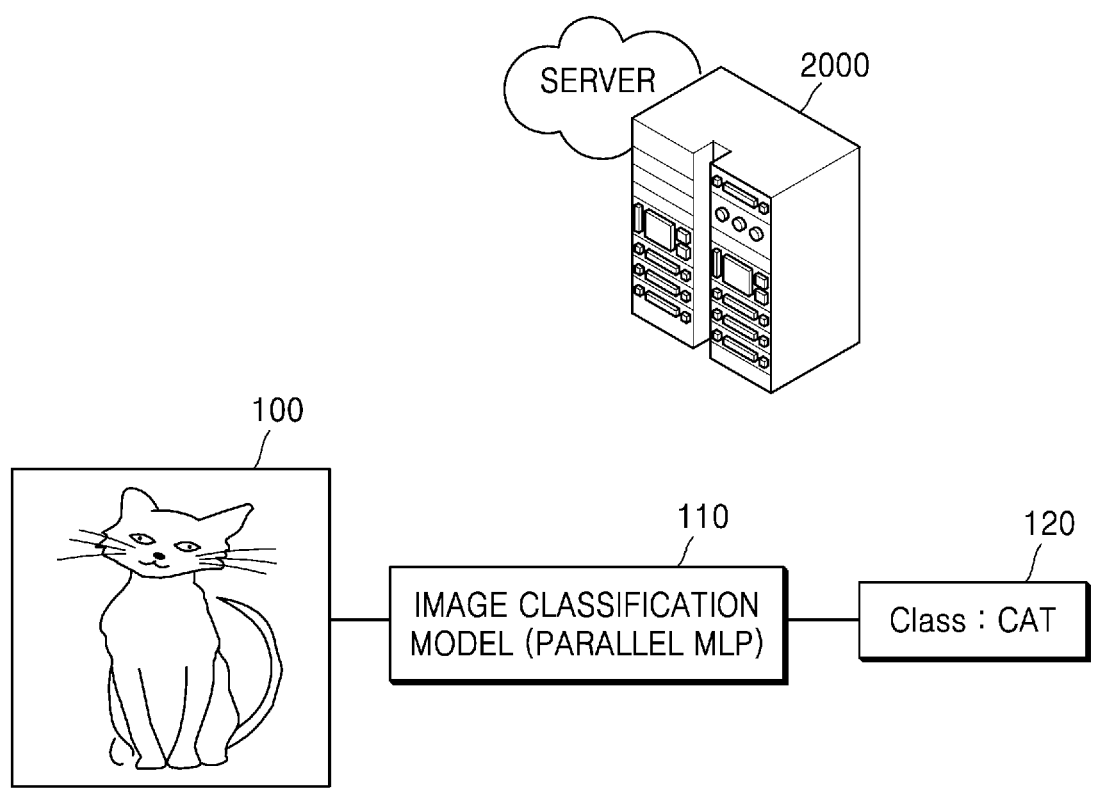
FIG. 1 is a diagram schematically illustrating an operation of a server classifying an image according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Terms that are used in the specification will be briefly described, and the disclosure will be described in detail.

Although the terms used in the disclosure are selected, as much as possible, from general terms that are widely used at present while taking into consideration the functions obtained in accordance with the disclosure, these terms may be replaced by other terms based on intentions of one of ordinary skill in the art, customs, emergence of new technologies, etc. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

All terms including technical and scientific terms used herein have the same meaning as commonly understood by one of ordinary skill in the art to which the disclosure belongs. While terms as "first," "second," etc., may be used in the specification so as to describe various components, such components must not be limited to the above terms. The above terms are used only to distinguish one component from another.

Throughout the specification, when a part "includes" or "comprises" a component, unless there is a particular description contrary thereto, the part may further include other components, not excluding the other components. Also, the terms such as "unit," "module," or the like used in the specification indicate a unit for processing at least one function or operation, wherein the unit and the module may be embodied as hardware or software or embodied by combining hardware and software.

Hereinafter, embodiments of the disclosure will now be described more fully with reference to the accompanying drawings for one of ordinary skill in the art to be able to perform the disclosure without any difficulty. However, the disclosure may be embodied in many different forms and should not be construed as being limited to the embodiments set forth herein. In addition, parts irrelevant to the description will be omitted in the drawings for a clear description of the disclosure, and like reference numerals will denote like elements throughout the specification.

FIG. 1 is a diagram schematically illustrating an operation of a server classifying an image according to an embodiment of the disclosure.

In an embodiment of the disclosure, a server 2000 may classify an input image 100. The server 2000 may classify a class 120 of the input image 100 by using an image classification model 110.

Referring to FIG. 1, because the input image 100 is an image including 'cat', the server 2000 may classify the class 120 of the input image 100 as 'cat' by using the image classification model 110.

In the disclosed embodiment of the disclosure, the image classification model 110 includes a plurality of parallel multi-layer perceptron (MLP) layers (hereinafter, parallel MLP layers). The plurality of parallel MLP layers are sequentially connected to each other. That is, the plurality of parallel MLP layers may be distinguished as an input layer (input parallel MLP layer) that is a first layer that receives input vectors, a plurality of hidden layers (hidden parallel MLP layers) between an input layer and an output layer, and the output layer (output parallel MLP layer) that is a final layer for obtaining an inference result.

Each parallel MLP layer processes features transferred from a previous parallel MLP layer. A processing result is transmitted to a next parallel MLP layer, and a classification probability value is obtained through a final parallel MLP layer. Each of the plurality of parallel MLP layers includes two or more MLPs. In each of the parallel MLP layers, operations of the two or more MLPs are respectively performed in parallel.

Hereinafter, with reference to the drawings and descriptions thereof to be described below, descriptions related to the architecture, operation process, and characteristics of the image classification model 110 used in the disclosure are described in detail.

Figure 2:
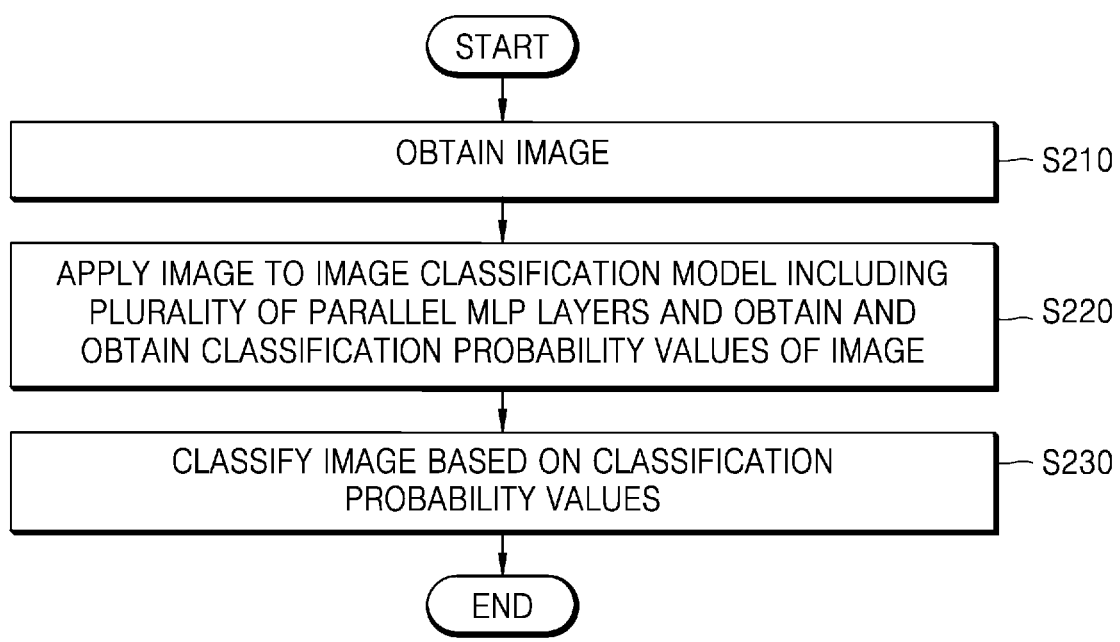
FIG. 2 is a flowchart illustrating an operation of a server classifying an image according to an embodiment of the disclosure.

FIG. 2 is a flowchart illustrating an operation in which a server classifies an image according to an embodiment of the disclosure.

Referring to FIG. 2, in operation S210, the server 2000 according to an embodiment obtains an image.

In an embodiment of the disclosure, the server 2000 may obtain the image stored in a memory of the server 2000. In an embodiment of the disclosure, the server 2000 may obtain the image from outside the server 2000. For example, the server 2000 may receive an image stored in another electronic device from the other electronic device, or may receive an image captured by using a camera of another electronic device from the other electronic device.

The server 2000 may pre-process the image in order to classify the obtained image. For example, the server 2000 may use methods such as image resolution adjustment, image cropping, pixel padding, etc. to apply the obtained image to an image classification model. For example, when the image classification model receives an image having a size of 224×224, the server 2000 may preprocess the obtained image using any one of a variety of available preprocessing algorithms and process the obtained image into the image having the size of 224×224.

In operation S220, the server 2000 according to an embodiment applies the obtained image to the image classification model including a plurality of parallel MLP layers.

In the disclosed embodiment of the disclosure, an MLP refers to an artificial neural network including an input layer, one or more hidden layers, and an output layer, and may include an activation function.

In an embodiment of the disclosure, the image classification model may be an artificial intelligence model that receives an image and outputs classification probability values of the image. The image classification model may include the plurality of parallel MLP layers for operations of features obtained from an image. Each of the plurality of parallel MLP layers may include two or more MLPs. Operations of the two or more MLPs included in each of the parallel MLP layers may be performed in parallel.

For example, one parallel MLP layer may include two MLPs of a first MLP and a second MLP. In this case, operations of the first MLP and the second MLP included in the parallel MLP layer may be performed in parallel. In another example, one parallel MLP layer may include a first MLP, a second MLP, and a third MLP. In this case, the operations of the first MLP, the second MLP, and the third MLP included in the parallel MLP layer may be performed in parallel. The number of MLPs included in one parallel MLP layer is not limited to two or three, and two or more MLPs may be included in one parallel MLP layer.

In an embodiment of the disclosure, the server 2000 obtains classification probability values of an image output from the image classification model. The image classification model sequentially performs operations through the plurality of parallel MLP layers, and finally outputs the classification probability values of the image through an average pooling layer and a fully connected layer.

For example, the server 2000 may obtain probability values with respect to a class to which an input image belongs: class A probability x, class B probability y, class C probability z, . . . , etc. by using the image classification model.

In operation S230, the server 2000 according to an embodiment of the disclosure classifies the image based on the classification values.

For example, the probability values output from the image classification model are the class A probability x, the class B probability y, and the class C probability z, and, among the probability values x, y, and z, when the class B probability y has the greatest value, the server 2000 may classify the input image as class B.

Figure 3:
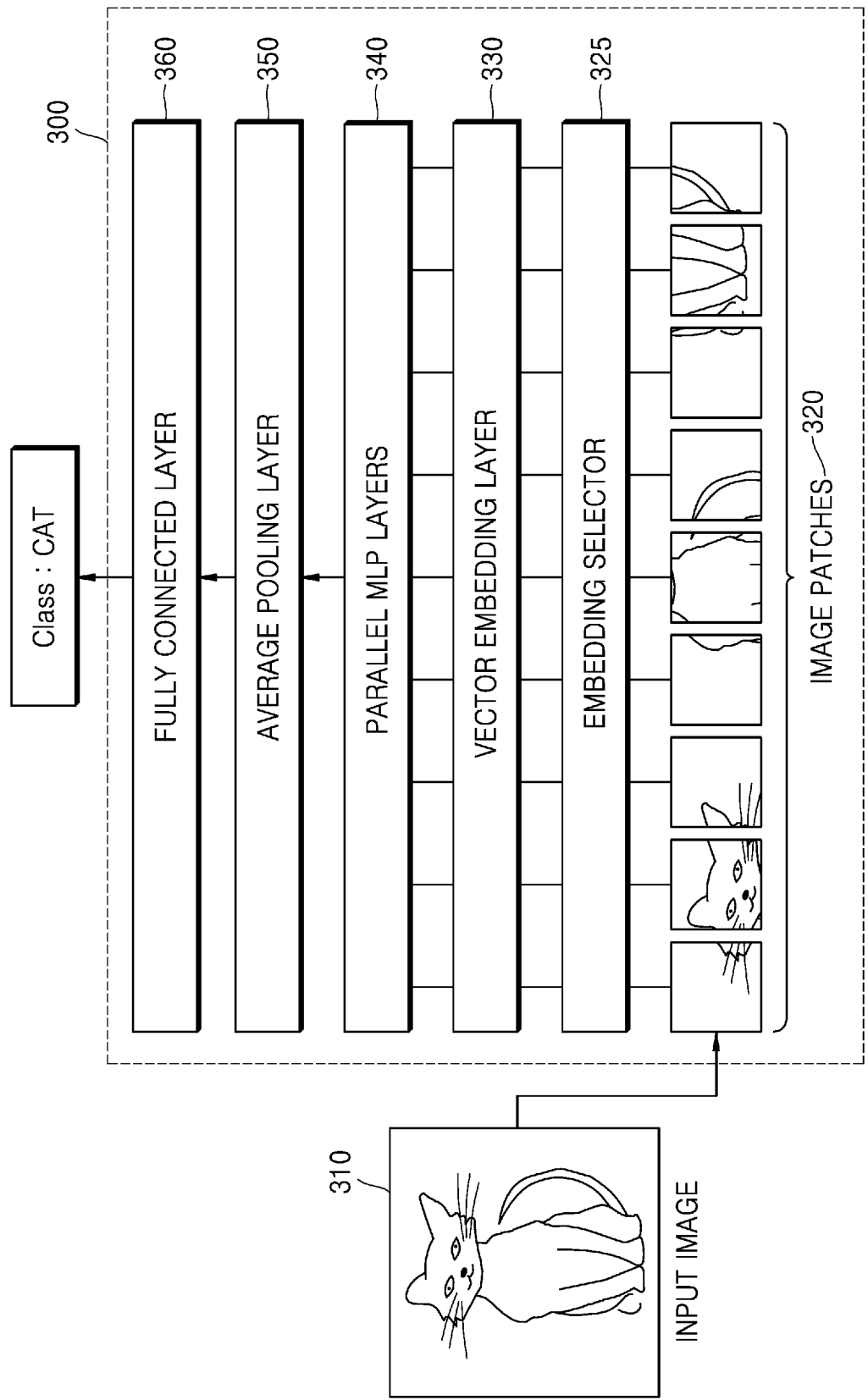
FIG. 3 is a diagram illustrating the architecture of an image classification model used by a server for image classification according to an embodiment of the disclosure.

FIG. 3 is a diagram illustrating the architecture of an image classification model used by a server for image classification according to an embodiment of the disclosure.

In an embodiment of the disclosure, the server 2000 may classify an image by using an image classification model 300. The image classification model 300 may include a plurality of parallel MLP layers 340. Hereinafter, the architecture of the image classification model 300 used in the disclosure is described in more detail.

The image classification model 300 may include at least a vector embedding layer 330, parallel MLP layers 340, an average pooling layer 350, and a fully connected layer 360.

In an embodiment of the disclosure, the parallel MLP layers 340 may include an input parallel MLP layer (initial parallel MLP layer), one or more hidden parallel MLP layers, and an output parallel MLP layer (last parallel MLP layer). Each of the parallel MLP layers 340 may include two or more MLPs.

In an embodiment of the disclosure, when an input image 310 is input to the image classification model 300, the input image 310 may split to generate a plurality of image patches 320. For example, when a resolution of the input image 310 is (H, W) and a resolution of each of the image patches 320 is (P, P), the number of the plurality of image patches 320 is $S=HW/P^2$. Hereinafter, in describing the embodiments of the disclosure, for convenience of description, a case in which the number S of the plurality of image patches 320 generated from the input image 310 is 9 is described as an example. That is, the plurality of image patches 320 includes a total of nine image patches of first to ninth image patches. However, this is only an example for convenience of description, and the number S of the plurality of image patches 320 may be a different value.

In an embodiment of the disclosure, in the vector embedding layer 330 of the image classification model 300, the image patches 320 are embedded as vectors. The vector embedding layer 330 embeds the plurality of image patches 320 and generates vectors to be input to the initial parallel MLP layer among the parallel MLP layers 340.

In an embodiment of the disclosure, each of the parallel MLP layers 340 may include a first MLP and a second MLP. In this case, an operation of the first MLP and an operation of the second MLP may be performed in parallel.

In the vector embedding layer 330, a plurality of types of vectors obtained by processing the image patches 320 in various schemes are generated.

In an embodiment of the disclosure, an embedding selector 325 may be used to embed the image patches 320 into the plurality of types of vectors by using various schemes. The embedding selector 325 may select pixels to be embedded as vectors inside the image patches 320. That is, the embedding selector 325 selects data that is one unit of vector embedding.

For example, when the length of all data to be input to a MLP is D, the length of a vector is $A_n$, and the number of vectors is $B_n$, then $A_n*B_n=D$ is established. Here, the length $A_n$ of the vector and the number $B_n$ of vectors may be any values (($A_1$, $B_1$), ($A_2$, $B_2$), . . . , ($A_n$, $B_n$)) satisfying $A_n*B_n=D$. In an embodiment of the disclosure, the embedding selector 325 may select data (pixels) by $A_n$ from the image patches 320, so as to generate the $B_n$ vectors having the length $A_n$.

As an example of selection of embedding selector 325, the embedding selector 325 may select pixels at the same location from the image patches 320. Specifically, the embedding selector 325 may select pixels located at (1, 1) for vector embedding in each of the first image patch to the ninth image patch of the image patches 320, and, in the same manner, may select pixels located at (P, P) for vector embedding in each of the first image patch to the ninth image patch. In this case, the pixels located at (1, 1) of the first image patch to the ninth image patch may be embedded as one unit vector by the vector embedding layer 330, and, in the same manner, the pixels located at (P, P) of the first image patch to the ninth image patch may be embedded as one unit vector by the vector embedding layer 330.

As another example, the embedding selector 325 may select pixels using a random sampling method (e.g., Gaussian sampling). The embedding selector 325 may select the $A_n$ pixels from the image patches 320 using the random sampling method. In this case, the selected $A_n$ pixels may be embedded as one unit vector by the vector embedding layer 330.

In an embodiment of the disclosure, when data which is a unit of embedding is selected by the embedding selector 325, vectors are generated by the vector embedding layer 330. The generated vectors may be input to the parallel MLP layers 340. In the disclosed embodiment of the disclosure, because at least two or more MLPs are included in each of the parallel MLP layers 340, the vectors generated by the embedding selector 325 and the vector embedding layer 330 are vectors embedded in two or more different schemes. Hereinafter, in the disclosure, first vectors, second vectors, and third vectors, which are some of various examples in which the embedding selector 325 selects pixels for embedding vectors, are described. However, this is only an example of various methods of generating vectors implementable through the disclosure, and vector embedding is not limited to first vectors, second vectors, and third vectors, which are examples to be described below.

For example, the first vectors may be generated by the vector embedding layer 330. The first vectors are vectors for recognizing a local characteristic of each of the image patches 320, and are obtained by linearly embedding all pixels in each of the image patches 320. The first vectors generated by the vector embedding layer 330 may be used as input data of the first MLP. An operation of the vector embedding layer 330 generating the first vectors to be input to the first MLP included in the plurality of parallel MLP layers 340 is described in more detail with reference to FIG. 6B.

Also, the second vectors may be generated by the vector embedding layer 330. The second vectors are vectors for recognizing a characteristic of a relationship between the image patches 320, and are obtained by linearly embedding pixels at the same location in each of the image patches 320. The second vectors generated by the vector embedding layer 330 may be used as input data of the second MLP. An operation of the vector embedding layer 330 generating the second vectors to be input to the second MLP included in the plurality of parallel MLP layers 340 is described in more detail with reference to FIG. 6C.

In an embodiment of the disclosure, each of the parallel MLP layers 340 may further include a third MLP in addition to the first MLP and the second MLP.

When each parallel MLP layer further includes the third MLP, the third vectors may be further generated by the vector embedding layer 330. The third vectors are obtained by linearly embedding pixels at the same location in each of the image patches 320 by reflecting channel information of the image. The third vectors generated by the vector embedding layer 330 may be used as input data of the third MLP. An operation of the vector embedding layer 330 generating the third vectors to be input to the third MLP included in the plurality of parallel MLP layers 340 is described in more detail with reference to FIG. 8.

Meanwhile, the number of MLPs included in one parallel MLP layer is not limited to two or three. The parallel MLP layer of the disclosure may include all other cases in which two or more MLPs are included in one parallel MLP layer and operations thereof are performed in parallel.

In an embodiment of the disclosure, an operation between features in vectors may be performed by the parallel MLP layers 340 of the image classification model 300. As described above, the parallel MLP layers 340 include layers including two or more MLPs of which operations are performed in parallel. In the parallel MLP layers 340, a plurality of layers may be sequentially connected to each other, and an operation result obtained in a previous layer is transferred to a next layer. A more detailed architecture of the parallel MLP layers 340 is further described with reference to FIG. 4.

In an embodiment of the disclosure, an operation result of the last parallel MLP layer among the parallel MLP layers 340 included in the image classification model 300 may be output, and an output of the last parallel MLP layer may be applied to a usually used neural network layer, such as the average pooling layer 350 and the fully connected layer 360. A classification probability value of the input image 310 may be obtained, by performing average pooling and full connection operations on the operation result of the last parallel MLP layer of the parallel MLP layers 340 of the image classification model 300.

Referring to FIG. 3, the input image 310 is an image including 'cat'. When the input image 310 including 'cat' is input to the image classification model 300 of the disclosure, an operation is performed through the layers included in the image classification model 300, and a class of the input image 310 may be classified as 'cat'.

Figure 4:
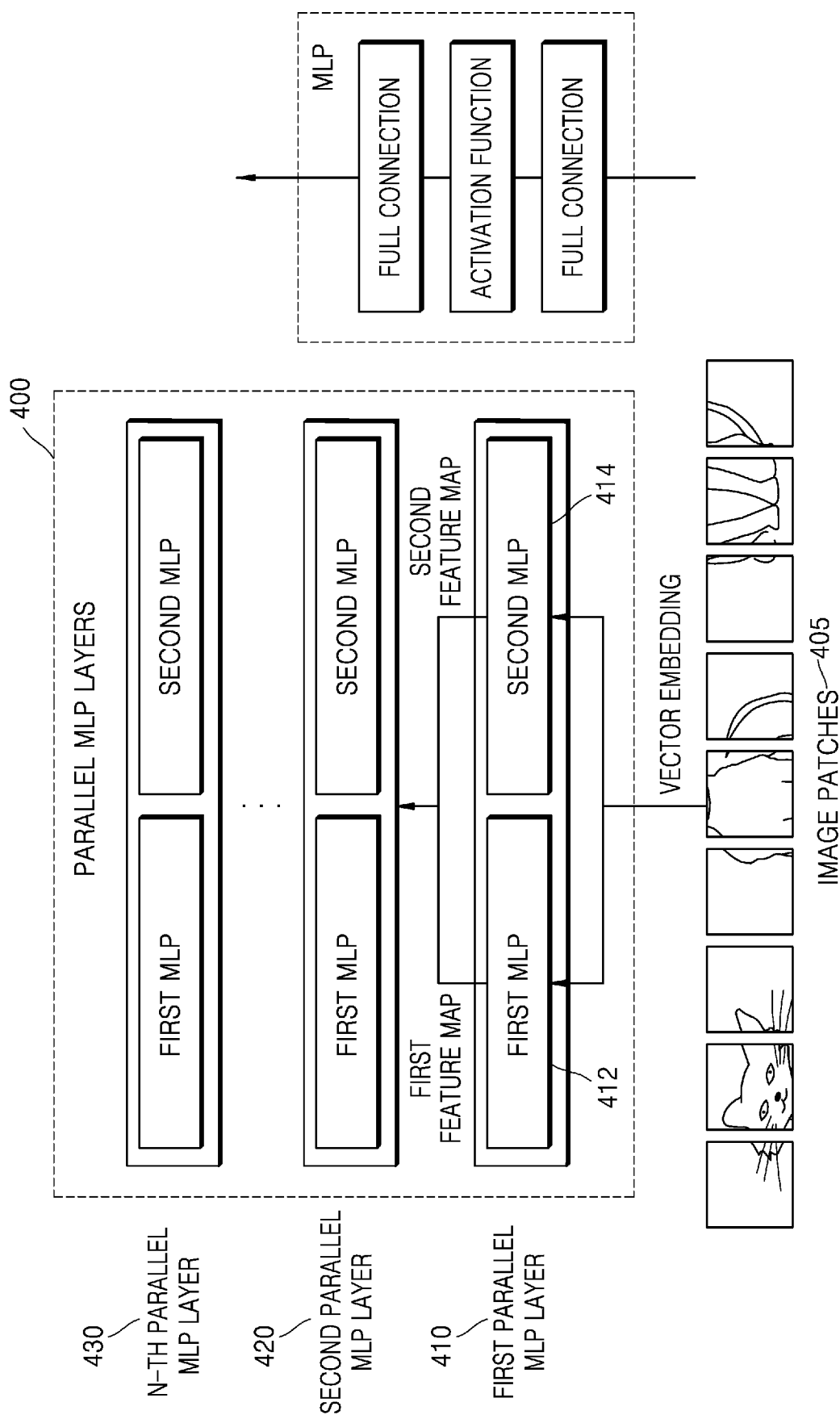
FIG. 4 is a diagram illustrating parallel multi-layer perceptron (MLP) layers of an image classification model used by a server for image classification according to an embodiment of the disclosure.

FIG. 4 is a diagram illustrating parallel MLP layers of an image classification model used by a server for image classification according to an embodiment of the disclosure.

FIG. 4 illustrates a plurality of parallel MLP layers 400 included in the image classification model according to an embodiment of the disclosure.

In an embodiment of the disclosure, the image classification model includes the plurality of parallel MLP layers 400, so that features may be mixed in various schemes. For example, a plurality of MLPs on which parallel operations are performed may be included in one parallel MLP layer. Vectors embedded in different schemes are respectively input to the plurality of MLPs. Meanwhile, as described with reference to FIG. 3, an embedding selector may be used to generate the vectors embedded in different schemes. The embedding selector has been described above, and thus, the same description thereof is omitted. For example, a first vector generated to recognize a local feature of one image patch may be input to a first MLP, and a second vector generated to recognize a relationship between image patches may be input to a second MLP. The image classification model including the parallel MLP layers 400 in which the first MLP and the second MLP are parallelized simultaneously recognizes characteristics in the image patches and characteristics between the image patches through a parallel operation, and thus, learning and inference speed of the image classification model may be improved.

Meanwhile, the parallel MLP layers 400 may further include another MLP (e.g., a third MLP). In some embodiments of the disclosure, third vectors embedded in a different scheme than those of the first and second vectors are input to the third MLP. For example, a third vector generated to recognize a relationship between the image patches by reflecting channel information of an image may be input to the third MLP. The parallel MLP layers 400 further include another MLP receiving different vectors, thereby using elements constituting an image patch in more various schemes in image classification. Accordingly, the accuracy of the image classification model may be improved.

The plurality of parallel MLP layers 400 include a first parallel MLP layer 410, a second parallel MLP layer 420, . . . , an N-th parallel MLP layer 430.

When the image classification model according to an embodiment is trained, initial layers of the plurality of parallel MLP layers 400 may be trained with local information of an image patch obtained by splitting an input image, and may be trained with the global information of the input image as the layer becomes deeper. In some embodiments of the disclosure, the image classification model may be trained by the server 2000 according to an embodiment of the disclosure.

The first, second, . . . , N-th parallel MLP layers 410, 420, and 430 included in the plurality of parallel MLP layers 400 have the same operation, and therefore, only the first parallel MLP layer 410 is described for convenience of descriptions.

The first parallel MLP layer 410 may include a first MLP 412 and a second MLP 414. Here, the first MLP 412 may be an MLP for learning a local characteristic of each of image patches 405, and the second MLP 414 may be an MLP for learning a relationship between the image patches 405.

In an embodiment of the disclosure, the image patches 405 generated based on the input image are embedded as vectors. In this case, when the image patches 405 are embedded as vectors, layer normalization may be performed, and first vectors and second vectors may be generated by vector embedding. The first MLP 412 may receive the first vectors and output a first feature map, and the second MLP 414 may receive the second vectors and output a second feature map. Also, a skip connection operation of adding results before and after the operation of the first MLP 412 and results before and after the operation of the second MLP 414 may be additionally performed.

Meanwhile, in the operation of the first parallel MLP layer 410, the operations of the first MLP 412 and the second MLP 414 may be performed in parallel. In addition, each of the first MLP 412 and the second MLP 414 may include two or more fully connected layers and an activation function. For example, vectors input to a MLP may be transformed into hidden dimensions through one or more fully connected layers to perform an operation, and an operation result may pass through the activation function (e.g., Gaussian error linear unit (GELU)). The result passing through the activation function may be transformed back to the original dimension through one or more fully connected layers.

The first feature map output from the first MLP 412 of the first parallel MLP layer 410 and the second feature map output from the second MLP 414 of the first parallel MLP layer 410 may be added and transferred to the second parallel MLP layer 420. In this case, an attention weight may be applied and added to each of the first feature map and the second feature map.

In an embodiment of the disclosure, in the second parallel MLP layer 420 to the N-th parallel MLP layer 430, operations are performed in the same or similar manner as in the first MLP layer 410, and an output of the N-th parallel MLP layer 430 passes through the pooling layer and the fully connected layer, and thus, a classification probability value of the input image may be obtained.

Figure 5:
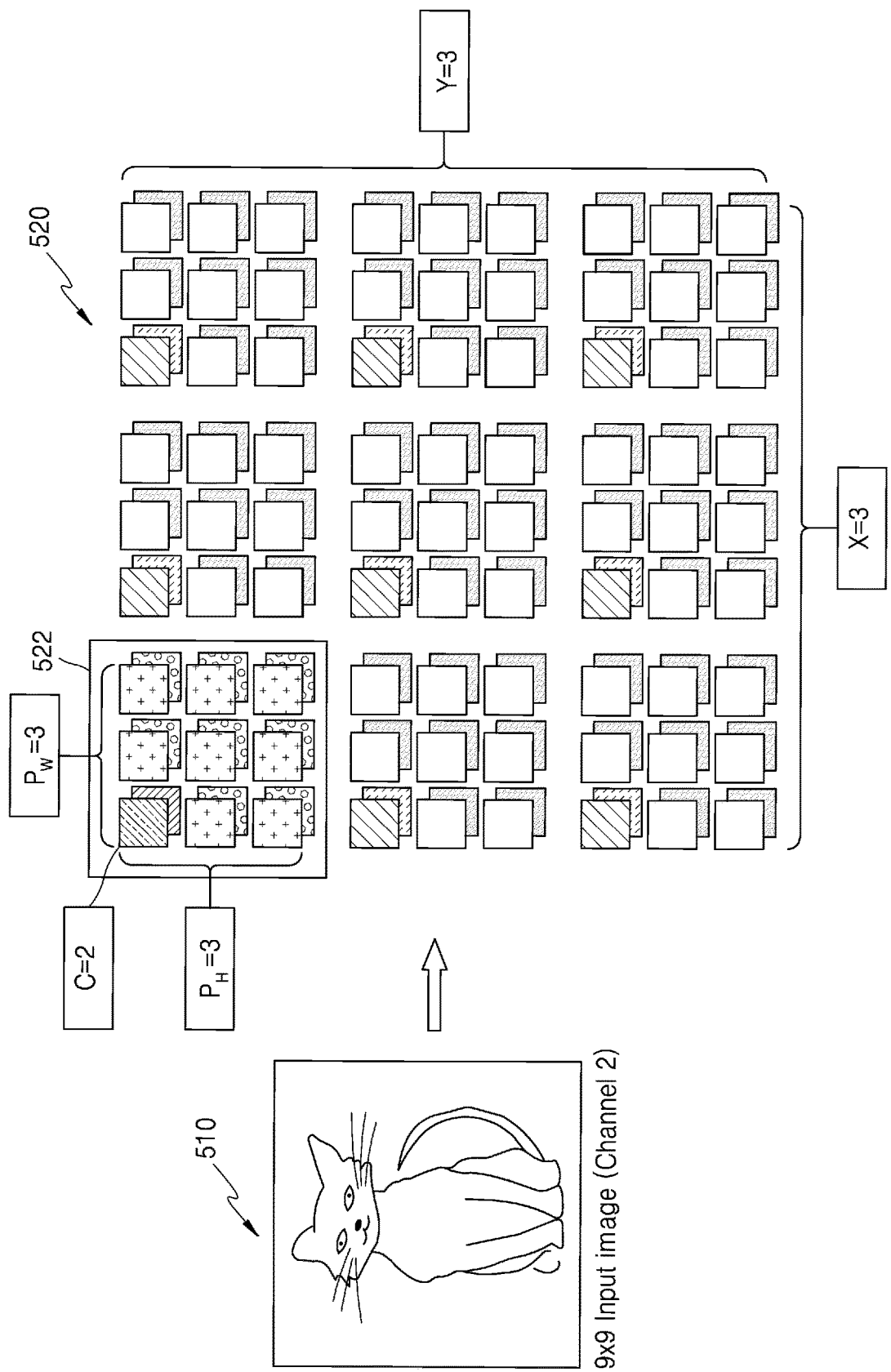
FIG. 5 is a diagram illustrating an input image and image patches generated from the input image according to an embodiment of the disclosure.

FIG. 5 is a diagram illustrating an input image and image patches generated from the input image according to an embodiment of the disclosure.

In an embodiment of the disclosure, when a resolution of an input image 510 is (H, W) and a resolution of each of the plurality of image patches 520 is (P, P), the number of the plurality of image patches 520 is $S = HW/P^2$.

In an embodiment of the disclosure, the server 2000 may generate the plurality of image patches 520 by splitting the input image 510 by using an image classification model. As a result of generating the plurality of image patches 520, the number S of the plurality of image patches 520 may be X*Y, and the resolution of each of the plurality of image patches 520 may be (PH, Pw).

FIG. 5 illustrates, for convenience of description, the input image 510 having the resolution of (9, 9) and two image channels as an example. In this case, the resolution of each of the plurality of image patches 520 is (3, 3), and the number of the plurality of image patches 520 is 9. In addition, because the input image 510 has the two image channels, first image patches 522 may include a first image patch of a first channel of the input image 510 and a second image patch of a second channel of the input image 510. Hereinafter, when the image patches correspond to the same part in the input image 510 and are different only in the image channels, the image patches are distinguished as image patches A, B, C, . . . . For example, the first image patch of the first channel of the input image 510 is distinguished as a first image patch A, and the first image patch of the second channel of the input image 510 is distinguished as a first image patch B.

However, the resolution and the number of channels of the input image 510 are not limited thereto. For example, the input image 510 may be an image including three channels of R, G, and B and having a resolution of (224, 224).

Figure 6A:
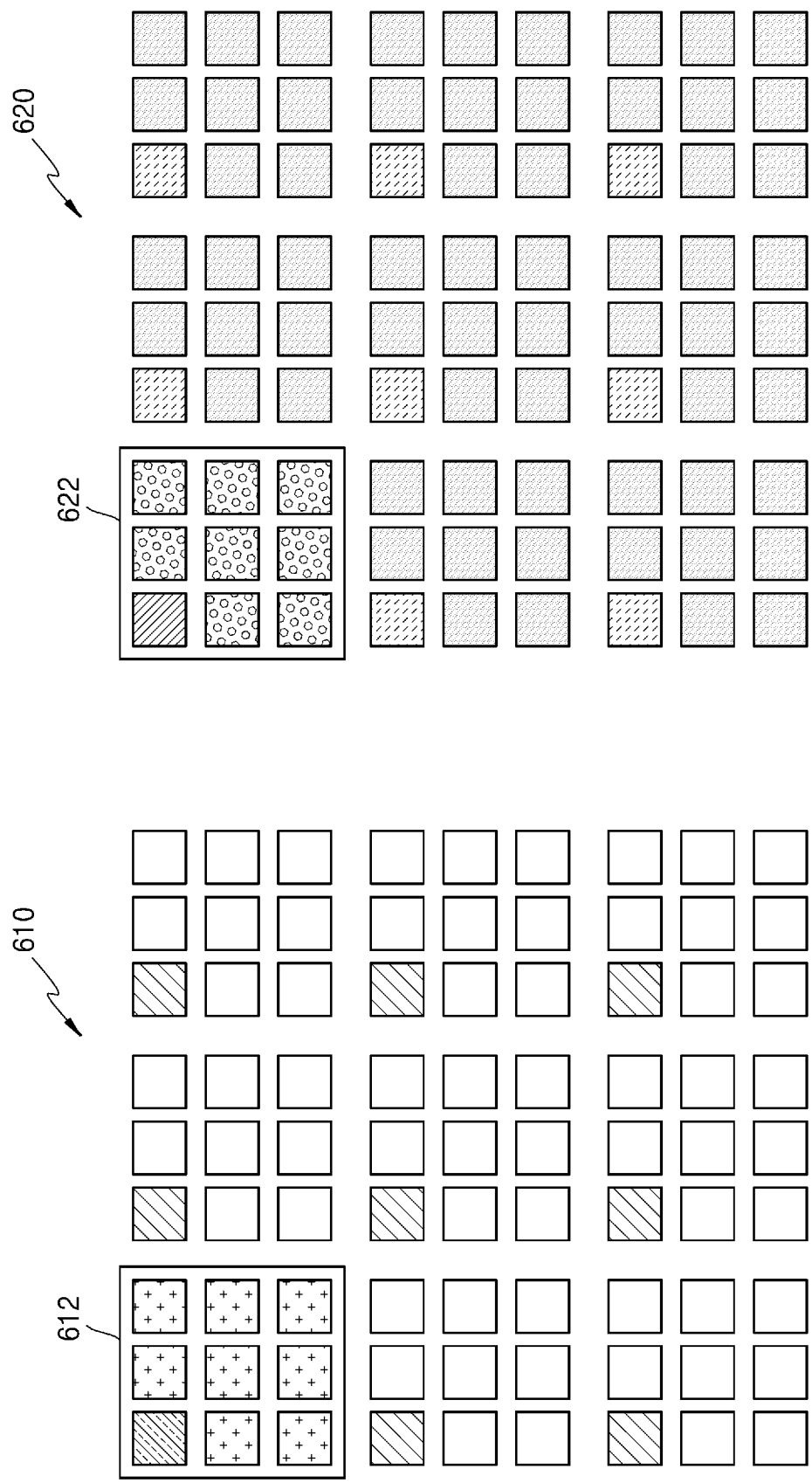
FIG. 6A is a diagram visually illustrating pixels of an input image that are input to an image classification model according to an embodiment of the disclosure.

FIG. 6A is a diagram visually illustrating pixels of an input image that are input to an image classification model according to an embodiment of the disclosure.

FIG. 6A illustrate image patches A 610 and image patches B 620 obtained for each channel from the input image 510 of FIG. 5 having the resolution of (9, 9) and two image channels, used as an example.

The image patches A 610 are image patches generated from a first channel of the input image, and the number of image patches is 9. A resolution of each of the image patches A is (3, 3). Specifically, the image patches A 610 may include a first image patch A 612, a second image patch A, . . . , and a ninth image patch A.

Also, the image patches B 620 are image patches generated from a second channel of the input image, and the number of image patches is 9. A resolution of each of the image patches B is (3, 3). Specifically, the image patches B 620 may include a first image patch B 622, a second image patch B, . . . , and a ninth image patch B.

In an embodiment of the disclosure, the server 2000 may execute the image classification model and embed the image patches A 610 and the image patches B 620 as vectors. An operation of generating first vectors and second vectors by vector embedding is described with reference to FIGS. 6B and 6C to be described below.

FIG. 6B is a diagram illustrating an operation of a server generating first vectors by using an image classification model according to an embodiment of the disclosure.

In an embodiment of the disclosure, the server 2000 may execute an execution code of the image classification model, so that the image classification model may perform operations for image classification.

Referring to FIG. 6B, the operation of generating the first vectors, which is part of operations for image classification, is described. The first vector refers to one of several types of intermediate data generated in an operation process for image classification of the image classification model.

In an embodiment of the disclosure, the first vectors may be generated by embedding the image patches A 610 and the image patches B 620 as vectors by using the image classification model.

Hereinafter, an 'N-th image patch A' refers to an N-th image patch among image patches generated from a first channel of an input image, and an 'N-th image patch B' refers to an N-th image patch among image patches generated from a second channel of the input image. That is, the ordinal number 'N' is for distinguishing image patches, and 'A, B' are for distinguishing channels of the image.

In an embodiment of the disclosure, the image patches A 610 include 9 image patches of the first image patch A 612 to a ninth image patch A, and the image patches B 620 include 9 image patches of the first image patch B 622 to a ninth image patch B.

In an embodiment of the disclosure, a first MLP is an MLP for learning a local feature of each of the image patches. An operation is performed by the first MLP on the first vectors generated from each of the image patches to mix features in the image patch. The first vectors are obtained by linearly embedding all pixels in the image patch, and the first MLP receives the first vectors.

In an embodiment of the disclosure, the first vectors in which all pixels in the image patch are linearly embedded may be generated by the image classification model. In this case, channel information of the image may be reflected. That is, when the input image is multi-channel, all pixels in the multi-channel image patches may be linearly embedded.

For example, when the number of channels of the input image is 2, the multi-channel image patches refer to an image patch of a first channel of the input image and an image patch of a second channel of the input image. By the image classification model, all pixels in the image patch of the first channel of the input image and the image patch of the second channel of the input image are embedded. In this case, the size of the first vector is PH*PW*C that is the product of the number of pixels in the image patch and the number of image channels. Also, the number of first vectors is X*Y that is the number of image patches.

This is described by way of a more specific example. In an embodiment of the disclosure, a first vector 1 630, in which all pixels in first image patch A 612 and all pixels in first image patch B 622 are linearly embedded, may be generated by the image classification model.

In the same manner, the first vectors may be generated by the image classification model with respect to each of the multi-channel image patches.

In an embodiment of the disclosure, a first vector 2 632, in which all pixels in a second image patch A and all pixels in a second image patch B are linearly embedded, and a first vector 3 634, in which all pixels in a third image patch A and all pixels in a third image patch B are linearly embedded, may be generated by the image classification model.

In the same manner, a first vector 9 636, in which all pixels in the ninth image patch A and all pixels in the ninth image patch B are linearly embedded, may be generated by the image classification model.

In an embodiment of the disclosure, the generated first vectors are applied as input data to the first MLP for learning a local characteristic of each of the image patches. For example, the first vector 1 630 is applied to the first MLP as input data, and each of the first vector 2 632, the first vector 3 634, . . . , the first vector 9 636 is applied to the first MLP as input data.

Figure 6C:
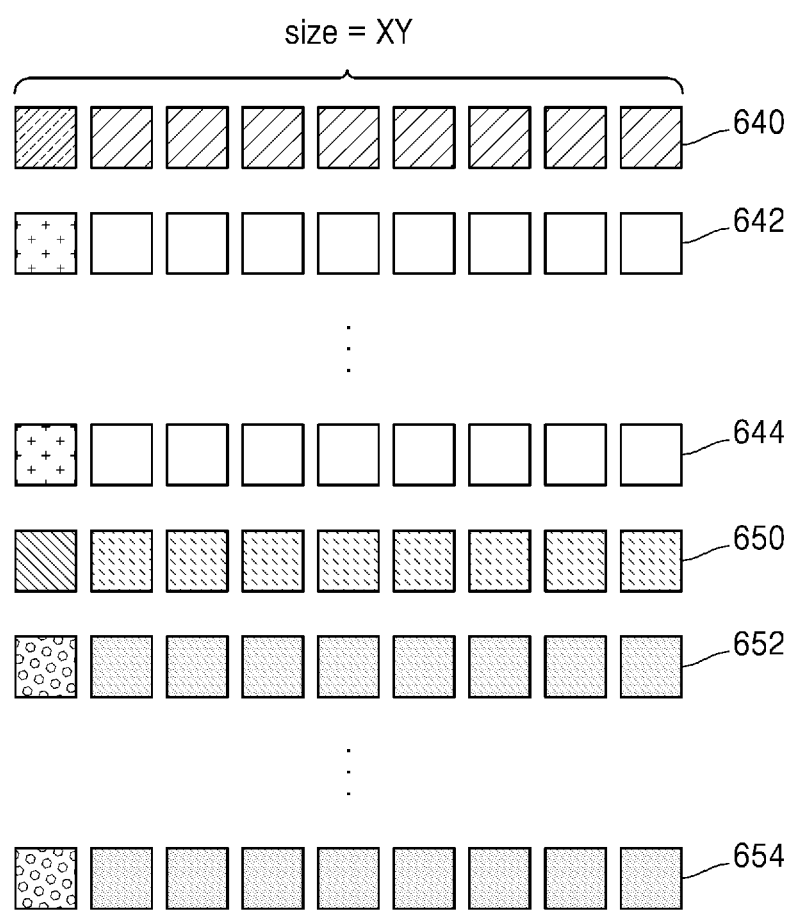
FIG. 6C is a diagram illustrating an operation of a server generating second vectors by using an image classification model according to an embodiment of the disclosure.

FIG. 6C is a diagram illustrating an operation of a server generating second vectors by using an image classification model according to an embodiment of the disclosure.

In an embodiment of the disclosure, the server 2000 may execute an execution code of the image classification model, so that the image classification model may perform operations for image classification.

Referring to FIG. 6C, the operation of generating the second vectors, which is part of operations for image classification, is described. The second vector refers to one of several types of intermediate data generated in an operation process for image classification of the image classification model.

In an embodiment of the disclosure, the second vectors may be generated by embedding the image patches A 610 and the image patches B 620 as vectors by using the image classification model.

Hereinafter, an 'N-th image patch A' refers to an N-th image patch among image patches generated from a first channel of an input image, and an 'N-th image patch B' refers to an N-th image patch among image patches generated from a second channel of the input image. That is, the ordinal number 'N' is for distinguishing image patches, and 'A, B' are for distinguishing channels of the image.

In an embodiment of the disclosure, the image patches A 610 include 9 image patches of the first image patch A 612 to the ninth image patch A, and the image patches B 620 include 9 image patches of the first image patch B 622 to the ninth image patch B.

In an embodiment of the disclosure, a second MLP is an MLP for learning a local feature of each of the image patches. An operation is performed by the second MLP on the first vectors generated from the image patches to mix features between the image patches. The second vectors are obtained by linearly embedding pixels extracted from the image patches, and the second MLP receives the second vectors.

In an embodiment of the disclosure, by the image classification model, pixels at the same location in the image patch may be extracted from each of the image patches, and the second vectors in which collection of the extracted pixels is linearly embedded may be generated. In this case, even when the input image is multi-channel, pixels at the same location in each of the image patches of the same channel may be linearly embedded.

For example, when the number of channels of the input image is 2, by the image classification model, pixels at the same location are embedded in each of image patches of a first channel of the input image, and pixels at the same location are embedded in each of image patches of a second channel of the input image. In this case, the size of the second vector is X*Y that is the number of image patches. Also, the number of second vectors is PH*PW*C that is the product of the number of pixels in the image patch and the number of image channels.

This is described by way of a more specific example. In an embodiment of the disclosure, a second vector 1 640, in which first pixels located at the same location in the image patch are linearly embedded in each of the image patches A 610, may be generated by the image classification model. In this case, a first pixel of the first image patch A 612, a first pixel of the second image patch A, . . . , and a first pixel of the ninth image patch A are embedded.

In the same manner, the second vectors may be generated by the image classification model with respect to pixels of another location of the image patches A 610.

In an embodiment of the disclosure, in each of the image patches included in the image patches A 610, pixels at the same location may be identified by the image classification model. A second vector 2 642, in which a second pixel of the first image patch A 612, a second pixel of the second image patch A, . . . , and a second pixel of the ninth image patch A are linearly embedded, may be generated by the image classification model.

In the same manner, a second vector 9 644, in which a ninth pixel of the first image patch A 612, a ninth pixel of the second image patch A, . . . , and a ninth pixel of the ninth image patch A are linearly embedded, may be generated by the image classification model.

In addition, a second vector 10 650, in which first pixels located at the same location in the image patch are linearly embedded in each of the image patches B 620, may be generated by the image classification model. In this case, a first pixel of the first image patch B 622, a first pixel of the second image patch B, . . . , and a first pixel of the ninth image patch B are embedded.

In the same manner, the second vectors may be generated by the image classification model with respect to pixels of another location in the image patches B 620.

In an embodiment of the disclosure, in each of the image patches included in the image patches B 620, pixels at the same location may be identified by the image classification model. A second vector 11 652, in which a second pixel of the first image patch B 622, a second pixel of the second image patch B, . . . , and a second pixel of the ninth image patch B are linearly embedded, may be generated by the image classification model.

In the same manner, a second vector 18 654, in which a ninth pixel of the first image patch B 622, a ninth pixel of the second image patch B, . . . , and a ninth pixel of the ninth image patch B are linearly embedded, may be generated by the image classification model.

In an embodiment of the disclosure, the generated second vectors are applied as input data to a second MLP for learning the relationship between the image patches. For example, the second vector 1 640 is applied to the second MLP as input data, and each of the second vector 2 642, . . . , the second vector 9 644, the second vector 10

650, the second vector 11 652, . . . , and the second vector 18 654 is applied to the second MLP as input data.

Figure 7A:
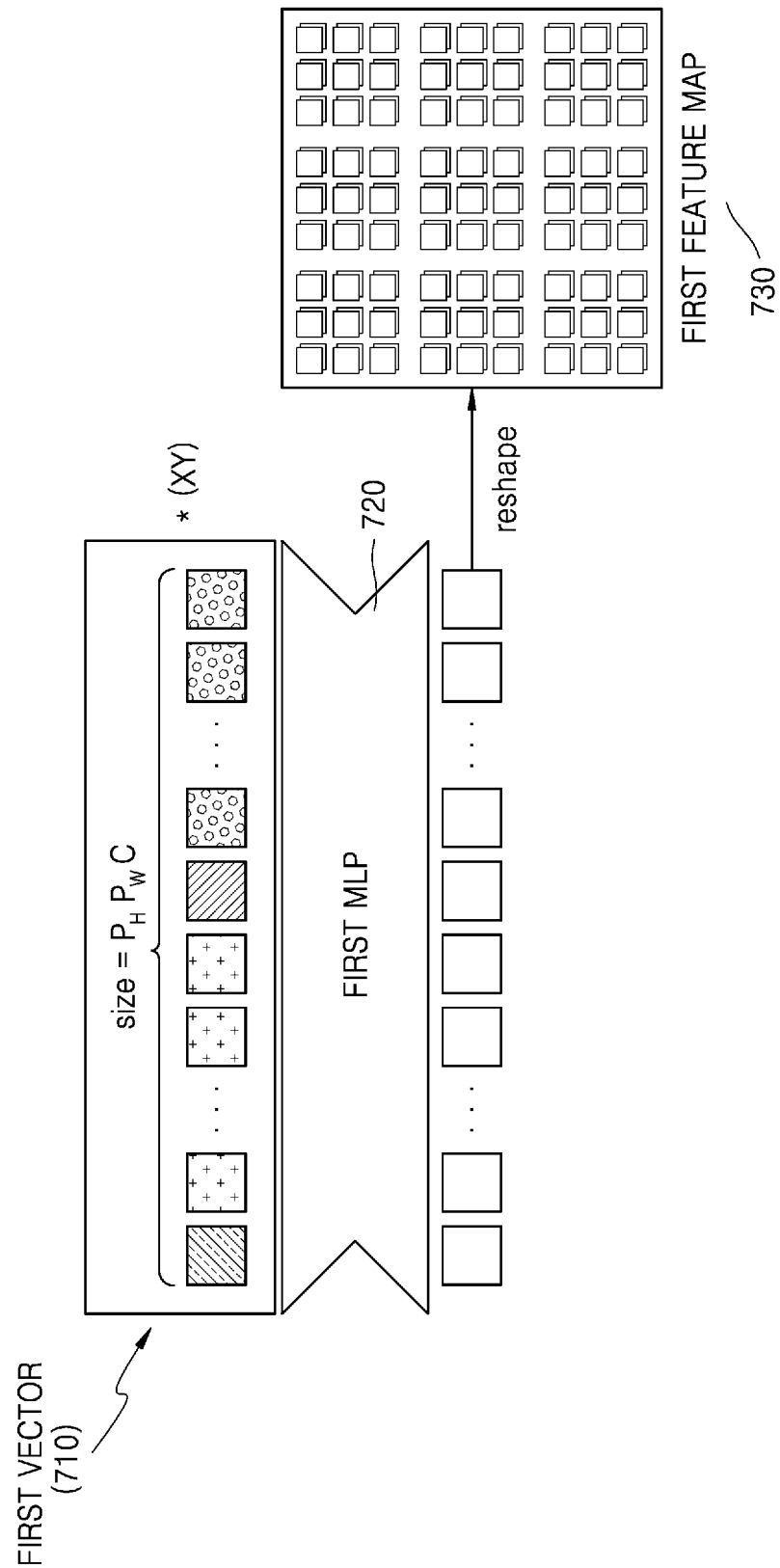
FIG. 7A is a diagram illustrating an operation of a first MLP according to an embodiment of the disclosure.

FIG. 7A is a diagram illustrating an operation of a first MLP according to an embodiment of the disclosure.

In an embodiment of the disclosure, the server 2000 may execute an execution code of the image classification model, so that the image classification model may perform operations for image classification.

Referring to FIG. 7A, an operation of performing operations on first vectors 710, which are part of operations for image classification, by a first MLP 720 is described. A first feature map 730 refers to one of several types of intermediate data generated in an operation process for image classification of the image classification model.

In an embodiment of the disclosure, the first feature map 730 may be obtained by applying a first vector 710 to the first MLP 720 in the image classification model. In this case, the size of the first vector 710 may be PH*PW*C that is the product of the number of pixels in the image patch and the number of image channels. Also, the number of the first vectors 710 may be X*Y that is the number of image patches.

The first vector 710 input to the first MLP 720 may be transformed into a hidden dimension through one or more fully connected layers in the first MLP 720 to perform an operation, and an operation result may pass through the activation function (e.g., GELU). The result passing through the activation function may be transformed back to the original dimension through one or more fully connected layers.

In the image classification model, the operation may be performed on each of the X*Y first vectors 710, and results of performing the operations on all the first vectors 710 may be processed to generate the first feature map 730.

In an embodiment of the disclosure, the plurality of first vectors 710 may share the one first MLP 720. By way of an example of the first vectors 630 to 636 described with reference to FIG. 6B, the first vector 1 630 is applied to the first MLP 720 as input data, and then, each of the first vector 2 632 and the first vector 3 634, . . . , and the first vector 9 636 may be sequentially applied to the first MLP 720 as input data. However, the disclosure is not limited thereto, and the image classification model may use a plurality of first MLPs 720 respectively corresponding to the first vectors 710.

Figure 7B:
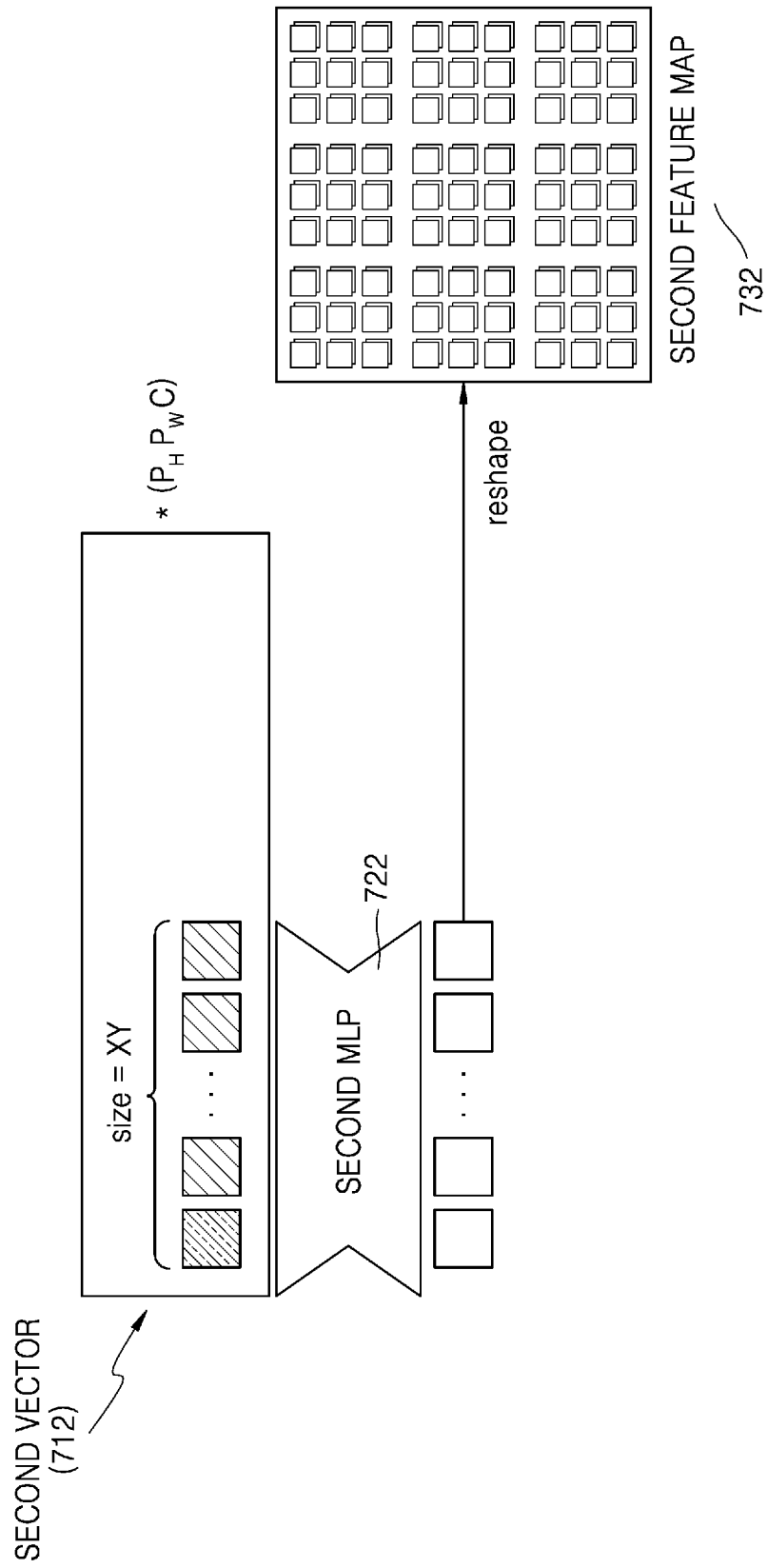
FIG. 7B is a diagram illustrating an operation of a second MLP according to an embodiment of the disclosure.

FIG. 7B is a diagram illustrating an operation of a second MLP according to an embodiment of the disclosure.

In an embodiment of the disclosure, the server 2000 may execute an execution code of the image classification model, so that the image classification model may perform operations for image classification.

Referring to FIG. 7B, an operation of performing operations on second vectors 712, which are part of operations for image classification, by a second MLP 722 is described. A second feature map 732 refers to one of several types of intermediate data generated in an operation process for image classification of the image classification model.

In an embodiment of the disclosure, the second feature map 732 may be obtained by applying a second vector 712 to the second MLP 722 in an image classification model. In this case, the size of the second vector 712 may be X*Y that is the number of image patches. Also, the number of second vectors 712 may be PH*PW*C that is the product of the number of pixels in the image patch and the number of image channels.

The second vector 712 input to the second MLP 722 may be transformed into a hidden dimension through one or more fully connected layers in the second MLP 722 to perform an operation, and an operation result may pass through the activation function (e.g., GELU). The result passing through the activation function may be transformed back to the original dimension through one or more fully connected layers.

In the image classification model, the operation may be performed on each of the $P_H*P_W*C$ second vectors 712, and results of performing the operations on all the second vectors 712 may be processed to generate the second feature map 732.

In an embodiment of the disclosure, the plurality of second vectors 712 may share one second MLP 722. By way of an example of the second vectors 640 to 654 described with reference to FIG. 6C, the second vector 1 640 is applied to the second MLP 722 as input data, and then, each of the second vector 2 642, . . . , the second vector 9 644, . . . , the second vector 10 650, the second vector 11 652, . . . , and the second vector 18 654 may be sequentially applied to the second MLP 722 as input data. However, the disclosure is not limited thereto, and the image classification model may use a plurality of second MLPs 722 respectively corresponding to the second vectors 712.

Figure 7C:
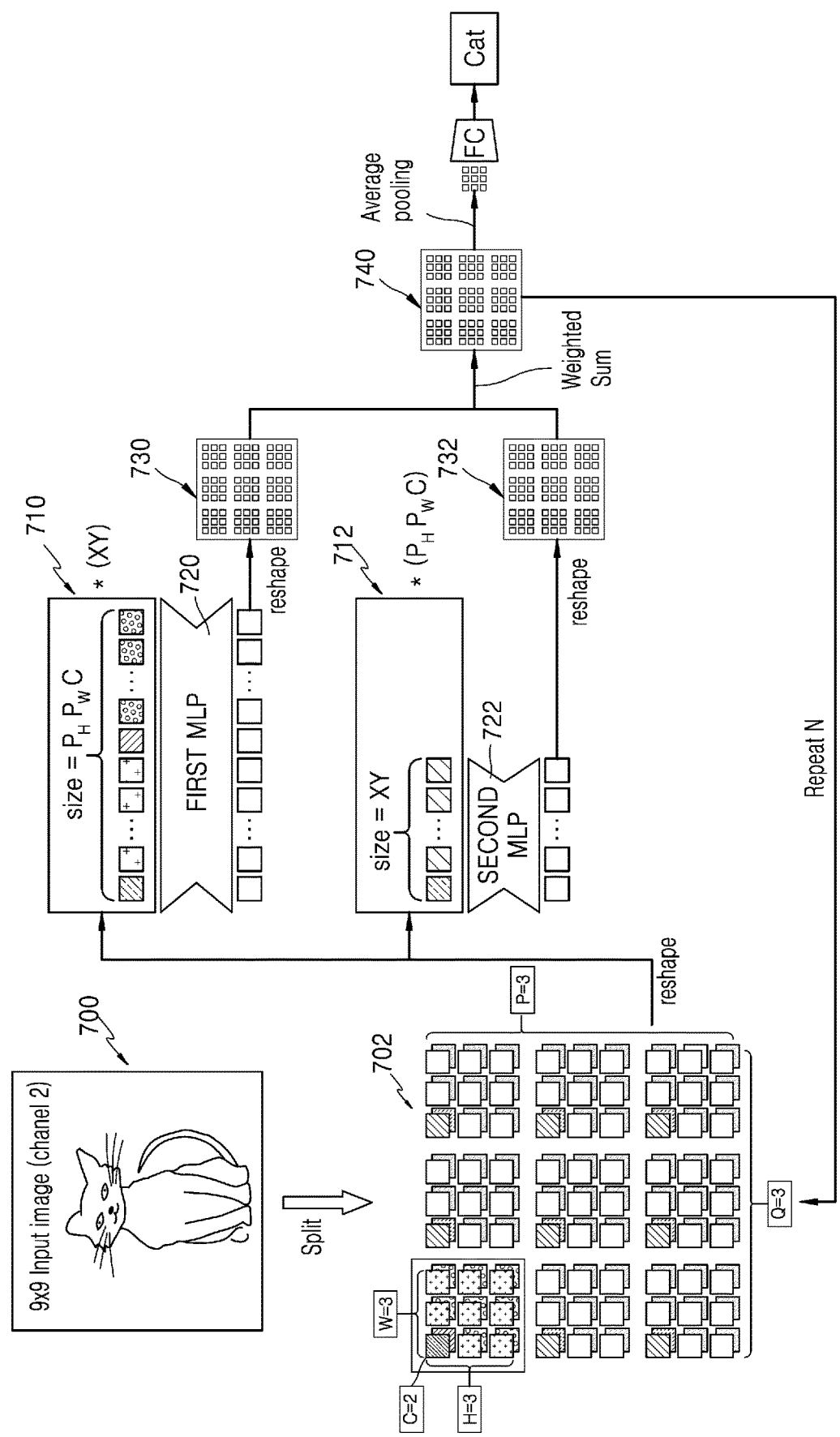
FIG. 7C is a diagram further illustrating FIGS. 7A and 7B, and generally illustrating an operation of a plurality of parallel MLP layers of an image classification model according to an embodiment of the disclosure.

FIG. 7C is a diagram further illustrating FIGS. 7A and 7B, and generally illustrating an operation of a plurality of parallel MLP layers of an image classification model according to an embodiment of the disclosure.

In an embodiment of the disclosure, the image classification model may include the plurality of (e.g., N) parallel MLP layers. As described above, each parallel MLP layer may include MLPs performing operations in parallel, and a first parallel MLP layer, which is an initial parallel MLP layer, may include the first MLP 720 and the second MLP 722. Hereinafter, among the plurality of parallel MLP layers, the first parallel MLP layer, which is the initial parallel MLP layer, is described. When the image classification model includes the N parallel MLP layers, the operation described with reference to FIG. 7C is repeated N times.

Referring to FIG. 7C, the server 2000 according to an embodiment of the disclosure may execute the image classification model. The image classification model splits an input image 700 to generate a plurality of image patches 702.

The image classification model embeds the plurality of image patches 702 in different schemes and generate the plurality of first vectors 710 and the plurality of second vectors 712. An operation of the image classification model generating the first vector 710 has been described with reference to FIG. 6B, and an operation of the image classification model generating the second vector 712 has been described with reference to FIG. 6C, and thus the same descriptions thereof are omitted.

The image classification model generates the first feature map 730 by using the first MLP 720 and generates the second feature map 732 by using the second MLP 722. In this regard, the operations of the first MLP 720 and the second MLP 722 are performed in parallel. The operation of the first MLP 720 of the image classification model has been described with reference to FIG. 7A and the operation of the second MLP 722 has been described with reference to FIG. 7B, and thus the same descriptions thereof are omitted.

The image classification model may generate an output feature map 740 of a first parallel MLP layer by using the first feature map 730 and the second feature map 732. In this case, the dimension of the first feature map 730 may be the same as the dimension of the second feature map 732. In addition, a weight may be applied to each of the first feature map 730 and the second feature map 732.

In an embodiment of the disclosure, the image classification model may repeat the above-described operation on each of the plurality of parallel MLP layers. For example, the image classification model may generate vectors to be respectively input to a first MLP of a second parallel MLP layer and a second MLP of the second parallel MLP layer included in the second parallel MLP layer, based on the output feature map 740 of the first parallel MLP layer.

The image classification model repeats the above-described operation on the N parallel MLP layers N times, and obtains a final output feature map from an N-th parallel MLP layer, which is a last parallel MLP layer. When the image classification model obtains the final output feature map, the final output feature map passes through a pooling layer (e.g., average pooling), and one or more fully connected layers, and finally outputs classification probability values of an image. The image classification model may classify the image based on the classification probability values of the image. In the example of FIG. 7C, because the input image 700 is an image including cat, a classification probability value of a class 'cat' may be the greatest among the obtained classification probability values. Accordingly, the image classification model may classify the input image 700 as 'cat'.

Figure 8:
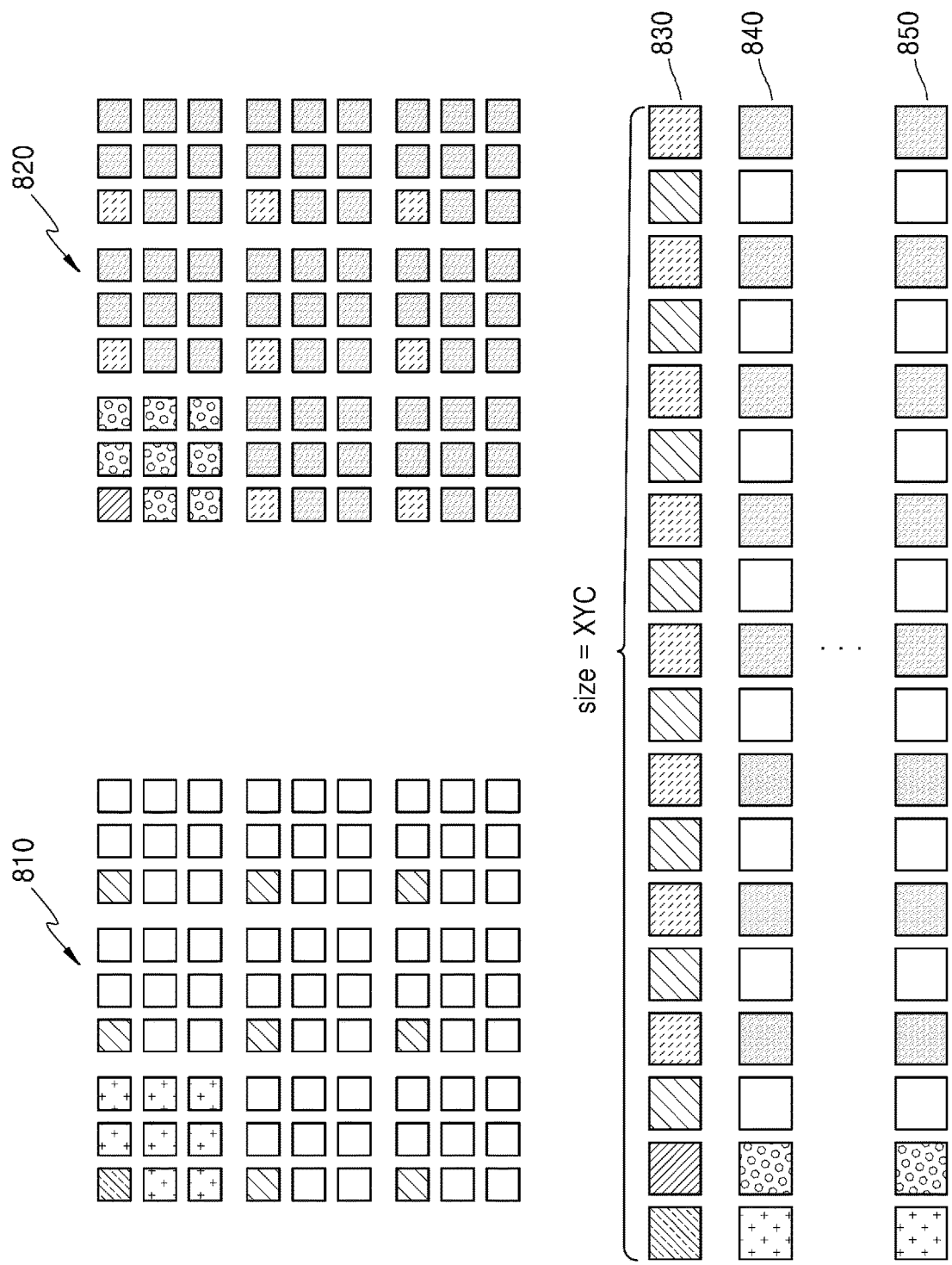
FIG. 8 is a diagram illustrating an operation of a server generating third vectors by using an image classification model according to an embodiment of the disclosure.

FIG. 8 is a diagram illustrating an operation of a server generating third vectors by using an image classification model according to an embodiment of the disclosure.

Referring to FIG. 8, image patches A 810 and image patches B 820 respectively correspond to the image patches A 610 and the image patches B 620 shown in FIG. 6A.

In an embodiment of the disclosure, the server 2000 may execute an execution code of the image classification model, so that the image classification model may perform operations for image classification. In FIG. 8, the operation of generating the third vectors, which is part of operations for image classification, is described. The third vector refers to one of several types of intermediate data generated in an operation process for image classification of the image classification model.

In an embodiment of the disclosure, the third vectors may be generated by embedding the image patches A 810 and the image patches B 820 as vectors by using the image classification model.

Hereinafter, an 'N-th image patch A' refers to an N-th image patch among image patches generated from a first channel of an input image, and an 'N-th image patch B' refers to an N-th image patch among image patches generated from a second channel of the input image. That is, the ordinal number 'N' is for distinguishing image patches, and 'A, B' is for distinguishing channels of the image.

In an embodiment of the disclosure, as in the example described above in FIG. 6A, the image patches A 610 include 9 image patches of first image patch A 612 to a ninth image patch A, and the image patches B 620 include 9 image patches of first image patch B 622 to a ninth image patch B.

In an embodiment of the disclosure, each of parallel MLP layers of the image classification model may further include a third MLP in addition to a first MLP and a second MLP described above. The third MLP is an MLP for learning a relationship between image patches by reflecting channel information of an image. An operation is performed by the third MLP on the third vectors generated from multi-channel image patches to mix features in the image patch. The third vectors are obtained by linearly embedding pixels extracted from the multi-channel image patches, and the third MLP receives the third vectors.

In an embodiment of the disclosure, by the image classification model, pixels at the same location in the image patch may be extracted from each of the image patches, and the third vectors in which collection of the extracted pixels is linearly embedded may be generated. In this case, the channel information of the image may be reflected. That is, when an input image is multi-channel, pixels at the same location in the multi-channel image patches may be linearly embedded in each of the multi-channel image patches.

For example, when the number of channels of the input image is 2, the multi-channel image patches refer to an image patch of a first channel of the input image and an image patch of a second channel of the input image. By the image classification model, pixels at the same location are embedded in each of the image patch of the first channel of the input image and the image patch of the second channel of the input image. In this case, the size of the third vector is X*Y*C that is the product of the number of image patches and the number of image channels. Also, the number of third vectors is $P_H*P_W$ that is the number of pixels in the image patch.

This is described by way of a more specific example. In an embodiment of the disclosure, a third vector 1 830, in which first pixels located at the same location in the image patch are linearly embedded in each of the image patches A 810, and first pixels located at the same location in the image patch are linearly embedded in each of the image patches A 820, may be generated by the image classification model. In this case, a first pixel of the first image patch A, a first pixel of the first image patch B, a first pixel of a second image patch A, a first pixel of a second image patch B, . . . , a first pixel of a ninth image patch A, and a first pixel of a ninth image patch B are embedded.

In the same manner, third vectors may be generated by the image classification model with respect to pixels of another location of the image patches A 810 and the image patches B 820.

In an embodiment of the disclosure, in each of the image patches included in the image patches A 810 and the image patches B 820, pixels at the same location may be identified by the image classification model. A third vector 2 840, in which a second pixel of the first image patch A, a second pixel of the first image patch B, a second pixel of the second image patch A, a second pixel of the second image patch B, . . . , a second pixel of the ninth image patch A, and a second pixel of the ninth image patch B are linearly embedded, may be generated by the image classification model.

In the same manner, a third vector 9 850, in which a ninth pixel of the first image patch A, a ninth pixel of the first image patch B, a ninth pixel of the second image patch A, a ninth pixel of the second image patch B, . . . , a ninth pixel of the ninth image patch A, and a ninth pixel of the ninth image patch B are linearly embedded, may be generated by the image classification model.

FIG. 9A is a diagram illustrating an operation of a third MLP according to an embodiment of the disclosure.

In an embodiment of the disclosure, the server 2000 may execute an execution code of the image classification model, so that the image classification model may perform operations for image classification.

Referring to FIG. 9A, an operation of performing operations on third vectors, which are part of operations for image classification, by a third MLP 924 is described. A third feature map 934 refers to one of several types of intermediate data generated in an operation process for image classification of the image classification model.

In an embodiment of the disclosure, each of parallel MLP layers of the image classification model may further include a third MLP in addition to a first MLP and a second MLP described above. The third feature map 934 may be obtained by applying a third vector 914 to the third MLP 924 in the image classification model. In this case, the size of the third vector 914 may be X*Y*C that is the product of the number of image patches and the number of image channels. Also, the number of third vectors may be $P_H*P_W$ that is the number of pixels in the image patch.

The third vector 914 input to the third MLP 924 may be transformed into a hidden dimension through one or more fully connected layers in the third MLP 924 to perform an operation, and an operation result may pass through the activation function (e.g., GELU). The result passing through the activation function may be transformed back to the original dimension through one or more fully connected layers.

In the image classification model, the operation may be performed on each of the $P_H*P_W$ third vectors 914, and t results of performing the operations on all the third vectors 914 may be processed to generate the third feature map 934.

In an embodiment of the disclosure, the plurality of third vectors 914 may share one third MLP 924. By way of an example of the third vectors 830 to 850 described with reference to FIG. 8, the third vector 1 830 is applied to the third MLP 924 as input data, and then, each of the third vector 2 840, . . . , the third vector 9 850 may be sequentially applied to the third MLP 924 as input data. However, the disclosure is not limited thereto, and the image classification model may use plurality of third MLPs 924 respectively corresponding to the third vectors 914.

Figure 9B:
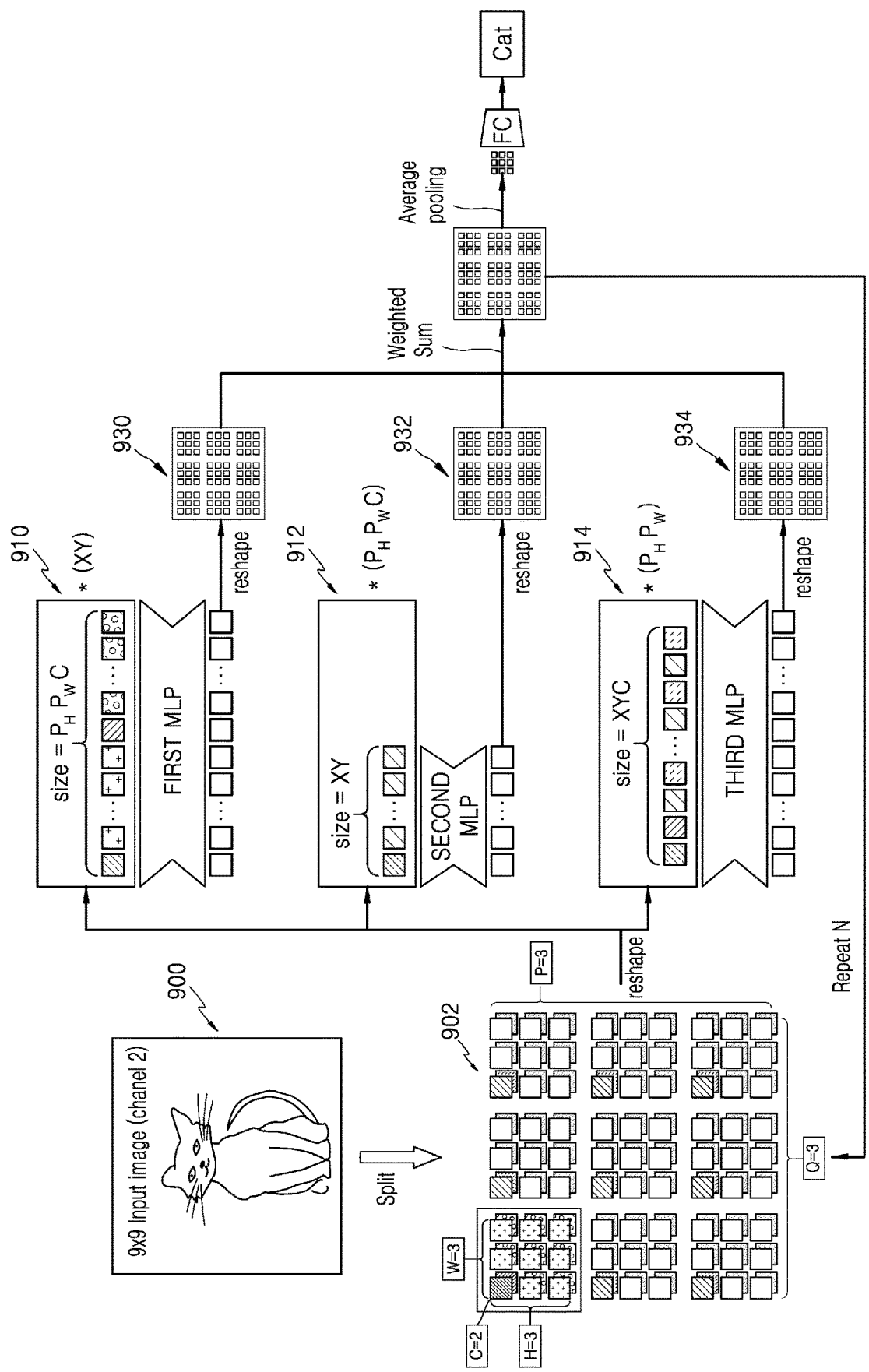
FIG. 9B is a diagram further illustrating FIG. 9A, and generally illustrating an operation when a third MLP is included in a plurality of parallel MLP layers of an image classification model according to an embodiment of the disclosure.

FIG. 9B is a diagram further illustrating FIG. 9A, and generally illustrating an operation when a third MLP is included in a plurality of parallel MLP layers of an image classification model.

In an embodiment of the disclosure, the image classification model may include the plurality of (e.g., N) parallel MLP layers. Each parallel MLP layer may include a first MLP 920, a second MLP 922, and a third MLP 924 that perform operations in parallel. Hereinafter, among the plurality of parallel MLP layers, a first parallel MLP layer, which is an initial parallel MLP layer, is described. When the image classification model includes the N parallel MLP layers, the operation described with reference to FIG. 9B is repeated N times.

Referring to FIG. 9B, the server 2000 according to an embodiment of the disclosure may execute the image classification model. The image classification model splits an input image 900 to generate a plurality of image patches 902.

The image classification model embeds the plurality of image patches 902 in different schemes and generate a plurality of first vectors 910, a plurality of second vectors 912, and a plurality of third vectors 914. The image classification model generates a first feature map 930 by inputting the first vector 910 into the first MLP 920, generates a second feature map 932 by inputting the second vector 912 into the second MLP 922, and generates the third feature map 934 by inputting the third vector 914 into the third MLP 924. In this case, the operations of the first MLP 920, the second MLP 922, and the third MLP 924 are performed in parallel. The operations of the image classification model generating vectors and the operations of each of the first, second, and third MLPs 920, 922, and 924 have been described above, and thus the same descriptions thereof are omitted.

The image classification model may generate an output feature map 940 of the first parallel MLP layer by using the first feature map 930, the second feature map 932, and the third feature map 934. In this case, the dimensions of the first feature map 930, the second feature map 932, and the third feature map 934 may be the same. In addition, a weight may be applied to each of the first feature map 930, the second feature map 932, and the third feature map 934.

In an embodiment of the disclosure, the image classification model may repeat the above-described operation on the N parallel MLP layers. This has already been described with reference to FIG. 7C, and thus, the same description thereof is omitted. According to an embodiment of the disclosure, the image classification model may classify the input image 900 as 'cat' by inferring a characteristic of the input image 900 by using the plurality of parallel MLP layers.

Figure 10:
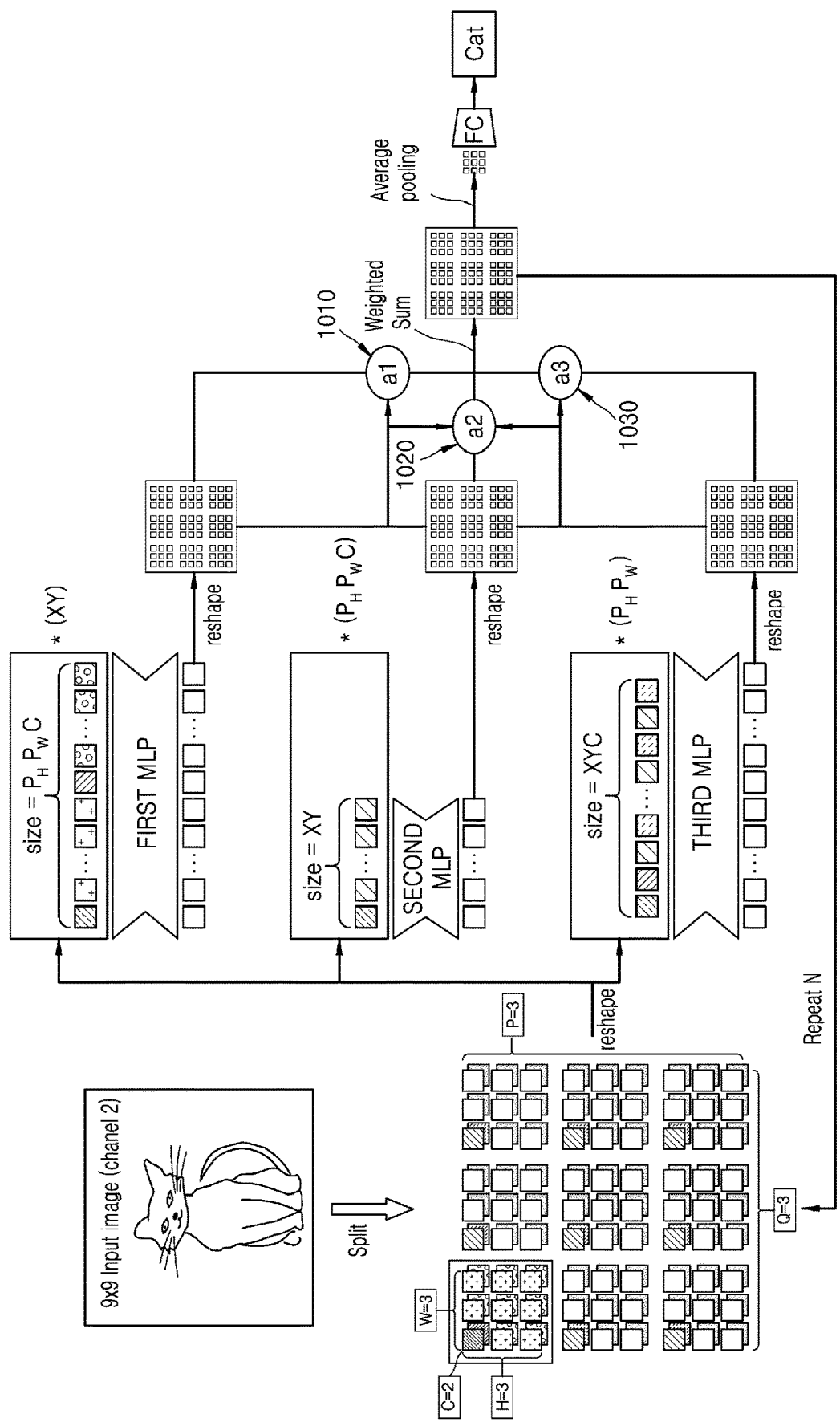
FIG. 10 is a diagram illustrating an operation of an image classification model applying an attention weight according to an embodiment of the disclosure.

FIG. 10 is a diagram illustrating an operation of an image classification model applying an attention weight according to an embodiment of the disclosure.

In an embodiment of the disclosure, the image classification model may include a plurality of (e.g., N) parallel MLP layers. As described above, each parallel MLP layer may include MLPs that perform operations in parallel. Hereinafter, among the plurality of parallel MLP layers, a first parallel MLP layer, which is an initial parallel MLP layer, is described. In addition, an example in which a first MLP, a second MLP, and a third MLP are included in the first parallel MLP layer is described. When the image classification model includes the N parallel MLP layers, the operation described with reference to FIG. 10 is repeated N times.

In an embodiment of the disclosure, the image classification model may calculate the attention weight with respect to feature maps output from the first MLP, the second MLP, and the third MLP. The image classification model obtains first, second, and third feature maps output from respective MLPs included in the first parallel MLP layer, and generates an output feature map of the first parallel MLP layer based on the obtained first, second, and third feature maps. In this regard, the image classification model may use the attention weight indicating a ratio to combine the first, second, and third feature maps output from the respective MLPs.

For example, the image classification model may apply an attention weight a1 1010 to the first feature map of the first MLP, an attention weight a2 1020 to the second feature map of the second MLP, and an attention weight a3 1030 to the third feature map of the MLP, and then adding the first, second, and third feature maps to which the attention weights a1 1010, a2 1020, and a3 1030 are respectively applied, thereby determining an output feature map of the first parallel MLP layer.

The image classification model may combine feature maps output from MLPs in each parallel MLP layer at different ratios while repeating the above-described operations on the N parallel MLP layers N times. The image classification model may classify an input image by obtaining a final output feature map from an N-th parallel MLP layer that is a last parallel MLP layer.

Meanwhile, a method of calculating a variety of attention weights may be used with respect to the attention weights a1 1010, a2 1020, and a3 1030 of the image classification model. For example, the attention weight may use a softmax function operation or a split attention operation. However, an attention weight mechanism used by the image classification model is not limited thereto.

Also, an example that the first MLP, the second MLP, and the third MLP are included in the parallel MLP layer has been described with reference to FIG. 10, but this is only an example, and the attention weight may be equally applied to the first MLP and the second MLP included in the parallel MLP layer as described above. For example, when the first MLP and the second MLP are included in the parallel MLP layer, an attention weight may be applied to each of the first feature map output from the first MLP and the second feature map output from the second MLP.

Figure 11:
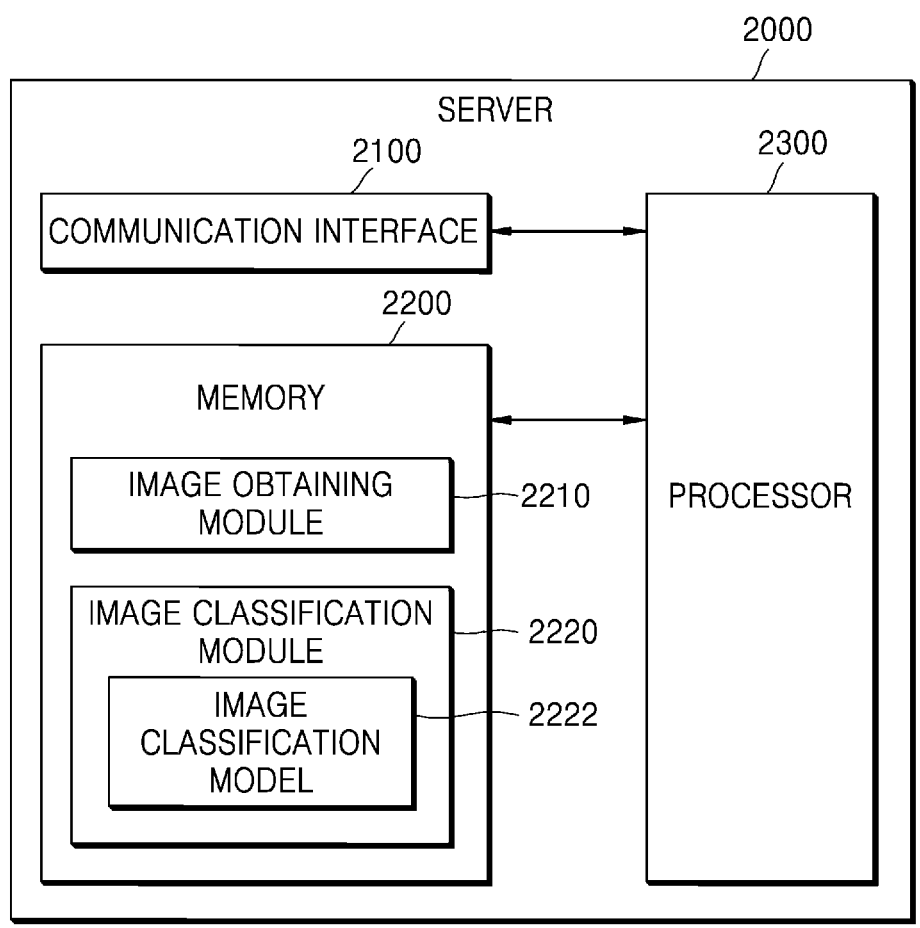
FIG. 11 is a block diagram illustrating a configuration of a server according to an embodiment of the disclosure.

FIG. 11 is a block diagram illustrating a configuration of a server according to an embodiment of the disclosure.

Referring to FIG. 11, the server 2000 according to an embodiment of the disclosure may include a communication interface 2100, a memory 2200, and a processor 2300.

The communication interface 2100 may perform data communication with other electronic devices under the control by the processor 2300.

The communication interface 2100 may perform data communication with the server 2000 or other devices by using at least one of data communication schemes including a wired local area network (LAN), a wireless LAN, wireless-fidelity (Wi-Fi), Bluetooth, Zigbee, Wi-Fi Direct (WFD), infrared Data Association (IrDA), Bluetooth Low Energy (BLE), near field communication (NFC), wireless broadband Internet (WiBro), Worldwide Interoperability for Microwave Access (WiMAX), shared wireless access protocol (SWAP), Wireless Gigabit Alliance (WiGig), and radio frequency (RF) communication.

The communication interface 2100 according to an embodiment of the disclosure may transmit/receive data for image classification to and from an external device. For example, the communication interface 2100 may receive, from the external device, a training dataset for training an image classification model, the image classification model, an input image, etc. Also, the communication interface 2100 may receive an input image and an image classification request from the external device, and transmit an image classification result to the outside.

The memory 2200 may store instructions, a data structure, and a program code which are readable by the processor 2500. In embodiments of the disclosure, operations performed by the processor 2300 may be implemented by executing instructions or codes of a program stored in the memory 2200.

The memory 2200 may include a flash memory, a hard disk, a multimedia card memory, a memory card (e.g., a secure digital (SD) or extreme digital (XD) memory card), a non-volatile memory including at least one of a random access memory (RAM), a static RAM (SRAM), a read-only memory (ROM), an electrically erasable programmable ROM (EEPROM), a programmable ROM (PROM), a magnetic memory, a magnetic disc, or an optical disc, and a volatile memory including a RAM or an SRAM.

The memory 2200 according to an embodiment of the disclosure may store one or more instructions or programs for the server 2000 to classify an image. For example, an image obtaining module 2210 and an image classification module 2220 may be stored in the memory 2200, and the image classification module 2220 may include an image classification model 2222.

The processor 2300 may control all operations of the server 2000. For example, the processor 2300 may control all operations of the server 2000 to classify an image by executing one or more instructions of a program stored in the memory 2200.

The processor 2300 may be configured as at least one of a central processing unit, a microprocessor, a graphics processing unit, application specific integrated circuits (ASICs), digital signal processors (DSPs), digital signal processing devices (DSPDs), programmable logic devices (PLDs), field programmable gate arrays (FPGAs), an application processor (AP), a neural processing unit (NPU), or an artificial intelligence (AI)-dedicated processor designed to have a hardware structure specified to process an AI model, but is not limited thereto.

In an embodiment of the disclosure, the processor 2300 may obtain images by executing the image obtaining module 2210. The processor 2300 may obtain and manage a training image set including training images for training the image classification model from the external device. Also, the processor 2300 may obtain an input image for classifying an image. The input image may be received from the external device or stored in the memory 2200 of the server 2000.

In an embodiment of the disclosure, the processor 2300 may classify the input image by executing the image classification module 2220. The processor 2300 may execute the image classification model 2222 included in the image classification module 2220 to infer and classify the input image. The image classification model 2222 may include a plurality of parallel MLP layers. In this case, two or more MLPs may be included in one parallel MLP layer, and operations of two or more MLPs are performed in parallel. The architecture and operation of the image classification model 2222 have already been described in the above-described embodiments of the disclosure, and thus, the same descriptions thereof are omitted.

Figure 12:
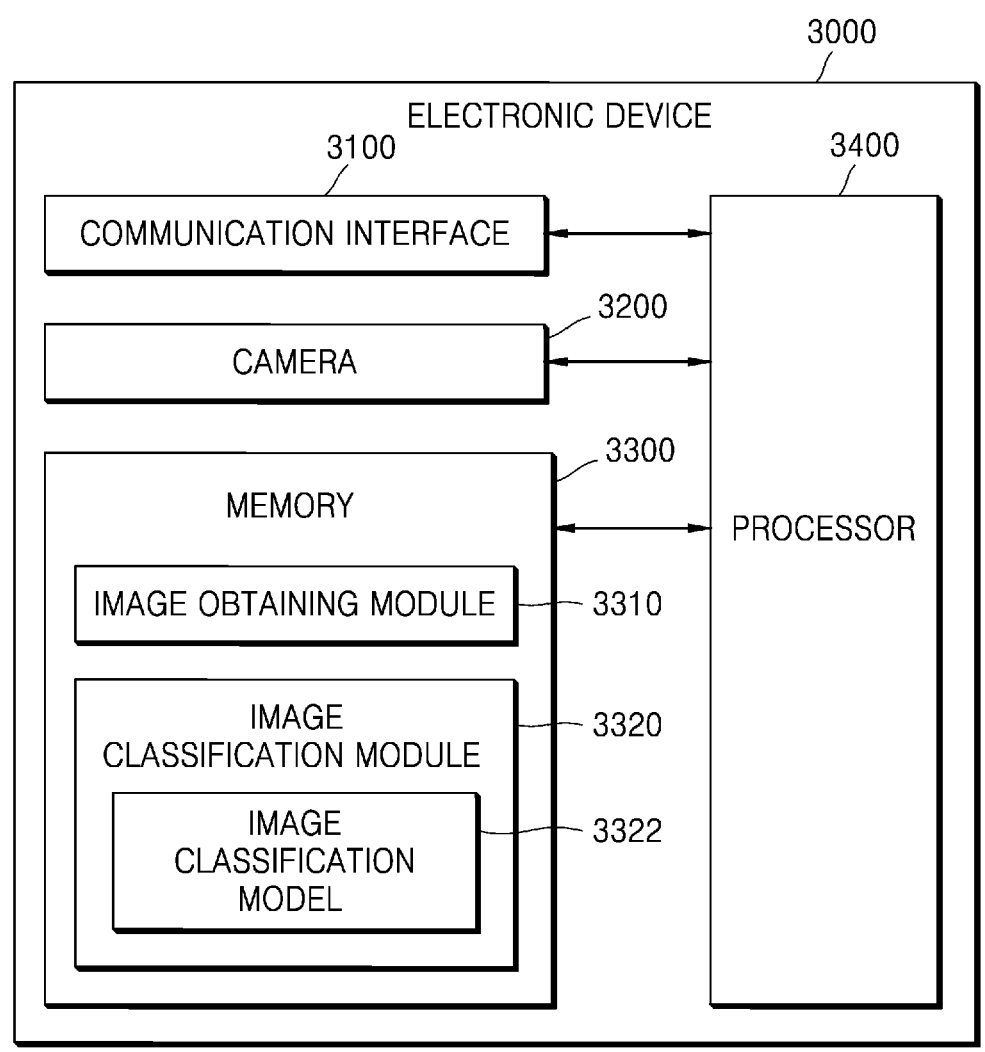
FIG. 12 is a block diagram illustrating an electronic device according to an embodiment of the disclosure.

FIG. 12 is a block diagram of an electronic device according to an embodiment of the disclosure.

In an embodiment of the disclosure, the above-described operations of the server 2000 generating a user-customized setting menu may be performed by an electronic device 3000.

The electronic device 3000 may include a communication interface 3100, a camera 3200, a memory 3300, and a processor 3400. The communication interface 3100, the memory 3300, and the processor 3400 of the electronic device 3000 respectively correspond to the communication interface 2100, the memory 2200, and the processor 2300 of the server 2000 of FIG. 11, and thus, the same descriptions thereof are omitted.

In an embodiment of the disclosure, an image classification model is a model including a plurality of MLPs, and the capacity of a model file may be sufficient to be stored in the memory 3300 of the electronic device 3000. The electronic device 3000 may classify an image by using an image classification model 3322 stored in the memory 3300. In this case, the image classification model 3322 may be received from an external device (e.g., a server, etc.).

In an embodiment of the disclosure, the camera 3200 may be configured as various types of cameras (e.g., an RGB camera, etc.) that capture images. The function and operation of the camera 3200 would be understood by a person of ordinary skill in the art.

In an embodiment of the disclosure, an image obtaining module 3310 of the processor 3400 may obtain an image obtained through the camera 3200 as an input image. The processor 3400 may classify the obtained image through the camera 3200 by using the image classification model 3322.

The block diagram of the server 2000 illustrated in FIG. 11 and the block diagram of the electronic device 3000 illustrated in FIG. 12 are block diagrams for an embodiment of the disclosure. Components in the block diagrams may be combined, a component may be added thereto, or at least one of the components may be omitted, according to actual specifications of an electronic device. That is, at least two components may be combined to one component, or one component may split into two components when necessary. Also, functions performed in each block are illustrating the embodiments of the disclosure, and detailed operations or devices do not limit the scope of the disclosure.

An operating method of a server according to an embodiment of the disclosure may be embodied as program commands executable by various computer implementations and may be recorded on a computer-readable recording medium. The computer-readable recording medium may include program commands, data files, data structures, and the like separately or in combinations. The program commands recorded on the computer-readable recording medium may be specially designed and configured for the disclosure. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a read-only memory (ROM), a random-access memory (RAM), or a flash memory. Examples of the program commands include high-level language codes that may be executed by a computer by using an interpreter or the like as well as machine language codes made by a compiler. A computer-readable medium may be provided in the form of a non-transitory recording medium. The non-transitory recording medium denotes that the recording medium is a tangible device and does not include signals (e.g., electromagnetic waves), and this term does not limit that data is semi-permanently or temporarily stored in the recording medium. For example, a 'non-transitory storage medium' may include a buffer storing data temporarily.

In addition, an operating method of a server according to embodiments of the disclosure may be included and provided in a computer program product. The computer program product is a product purchasable between a seller and a purchaser.

The computer program product may include a software program and a computer-readable storage medium in which the software program is stored. For example, the computer program product may include a software program-type product (e.g., a downloadable application) electronically distributed through a manufacturer of an electronic device or an electronic market (e.g., Google™ Play store or App Store). For electronic distribution, at least a portion of the software program may be stored in a storage medium or temporarily generated. In this case, the storage medium may be a server of the manufacturer, a server of the electronic market, or a storage medium of a relay server that temporarily stores the software program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

In this case, one of the server, the client device, and the third device may execute a method according to embodiments of the disclosure by executing the computer program product. Alternatively, at least two of the server, the client device, and the third device may execute a method according to embodiments of the disclosure in a distributed fashion by executing the computer program product.

For example, the server (e.g., a cloud server or an AI server) may execute the computer program product stored in the server, and may control the client device communicating with the server to perform a method according to embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A computer vision method of classifying an image by a server, the computer vision method comprising:
   obtaining, by the server, classification probability values of the image by applying the image to an image classification model including a plurality of parallel multi-layer perceptron (MLP) layers sequentially connected to each other; and
   based on the classification probability values, classifying, by the server, the image,
   wherein each of the plurality of parallel MLP layers comprises:
      a first MLP and a second MLP, an operation using the first MLP and an operation using the second MLP being performed in parallel, and
      dimensions of data before and after an operation of each of the plurality of parallel MLP layers are a same dimension by transforming an operation result of the first MLP to match a predefined original dimension, transforming an operation result of the second MLP to match the predefined original dimension, and then combining the transformed operation result of the first MLP with the transformed operation result of the second MLP to maintain the same dimension before and after the operation of each of the plurality of parallel MLP layers.

2. The computer vision method of claim 1, wherein an operation of a first parallel MLP layer that is an initial parallel MLP layer among the plurality of parallel MLP layers comprises:
   receiving image patches, as an input, obtained by splitting the image;
   obtaining a first feature map by using the first MLP in the first parallel MLP layer for learning a local characteristic of each of the image patches;
   obtaining a second feature map by using the second MLP in the first parallel MLP layer for learning a relationship between the image patches;
   generating an output feature map based on the first feature map and the second feature map; and
   transferring the output feature map to a second parallel MLP layer that is a next parallel MLP layer.

3. The computer vision method of claim 2, wherein the generating of the output feature map comprises:
   applying, by the server, an attention weight to each of the first feature map and the second feature map; and adding, by the server, the first feature map and the second feature map to which the attention weight is applied.

4. The computer vision method of claim 2, wherein the first MLP and the second MLP each comprise an active function layer and one or more fully connected layers.

5. The computer vision method of claim 2, wherein the obtaining of the first feature map by using the first MLP in the first parallel MLP layer for learning the local characteristic of each of the image patches comprises:
   obtaining, by the server, first vectors, in which all pixels in multi-channel image patches are linearly embedded, of the image with respect to each of the multi-channel image patches; and
   applying, by the server, the first vectors to the first MLP.

6. The computer vision method of claim 5, wherein the obtaining of the second feature map by using the second MLP in the first parallel MLP layer for learning the relationship between the image patches comprises:
   obtaining, by the server, second vectors, in which pixels at a same location are linearly embedded in each of the image patches of a same channel, of the image; and
   applying, by the server, the second vectors to the second MLP.

7. The computer vision method of claim 2,
   wherein each of the plurality of parallel MLP layers further comprises a third MLP, and
   wherein the third MLP performs operations in parallel with the first MLP and the second MLP.

8. The computer vision method of claim 7,
   wherein an operation of a first parallel MLP layer that is an initial parallel MLP layer among the plurality of parallel MLP layers further comprises:
      obtaining, by the server, a third feature map by using a third MLP for learning the relationship between the image patches by reflecting channel information of the image, and
   wherein the generating of the output feature map of the initial parallel MLP layer comprises:
      generating, by the server, the output feature map based on the first feature map, the second feature map, and the third feature map.

9. The computer vision method of claim 8, wherein the obtaining of the third feature map by using the third MLP for learning the relationship between the image patches by reflecting the channel information of the image comprises:
   identifying, by the server, pixels, of the image in each of multi-channel image patches, at a same location in the multi-channel image patches;
   obtaining, by the server, third vectors in which the pixels are linearly embedded; and
   applying, by the server, the third vectors to the third MLP.

10. A server for classifying an image, the server comprising:
   a communication interface;
   memory storing instructions; and
   one or more processors communicatively coupled to the communication interface and the memory,
   wherein the instructions, when executed by the one or more processors individually or collectively, cause the server to:
      obtain classification probability values of the image by applying the image to an image classification model including a plurality of parallel multi-layer perceptron (MLP) layers sequentially connected to each other, and
      based on the classification probability values, classify the image,
   wherein each of the plurality of parallel MLP layers comprises a first MLP and a second MLP,
   wherein an operation using the first MLP and an operation using the second MLP are performed in parallel, and
   wherein dimensions of data before and after an operation of each of the plurality of parallel MLP layers are a same dimension by transforming an operation result of the first MLP to match a predefined original dimension, transforming an operation result of the second MLP to match the predefined original dimension, and then combining the transformed operation result of the first MLP and the transformed operation result of the second MLP to maintain the same dimension before and after the operation of each of the plurality of parallel MLP layers.

11. The server of claim 10,
   wherein the instructions, when executed by the one or more processors individually or collectively, further cause the server to:
      perform an operation of a first parallel MLP layer that is an initial parallel MLP layer among the plurality of parallel MLP layers, and wherein the operation of the first parallel MLP layer comprises:
         receiving image patches, as an input, obtained by splitting the image;
         obtaining a first feature map by using the first MLP in the first parallel MLP layer for learning a local characteristic of each of the image patches;
         obtaining a second feature map by using the second MLP in the first parallel MLP layer for learning a relationship between the image patches;
         generating an output feature map, based on the first feature map and the second feature map; and
         transferring the output feature map to a second parallel MLP layer that is a next parallel MLP layer.

12. The server of claim 11, wherein the instructions, when executed by the one or more processors individually or collectively, further cause the server to:
   apply an attention weight to each of the first feature map and the second feature map; and
   add the first feature map and the second feature map to which the attention weight is applied.

13. The server of claim 11, wherein the first MLP and the second MLP each comprise an active function layer and one or more fully connected layers.

14. The server of claim 11, wherein the instructions, when executed by the one or more processors individually or collectively, further cause the server to:
   obtain first vectors, in which all pixels in multi-channel image patches are linearly embedded, of the image with respect to each of the multi-channel image patches; and
   apply the first vectors to the first MLP.

15. The server of claim 14, wherein the instructions, when executed by the one or more processors individually or collectively, further cause the server to:
   obtain second vectors, in which pixels at a same location are linearly embedded in each of the image patches of a same channel, of the image; and
   apply the second vectors to the second MLP.

16. The server of claim 11,
   wherein each of the plurality of parallel MLP layers further comprises a third MLP, and
   wherein the third MLP performs operations in parallel with the first MLP and the second MLP.

17. The server of claim 16,
wherein the instructions, when executed by the one or more processors individually or collectively, further cause the server to;
obtain the operation of the initial parallel MLP layer among the plurality of parallel MLP layers, and
wherein the operation of the initial parallel MLP layer comprises:
obtaining a third feature map by using a third MLP for learning the relationship between the image patches by reflecting channel information of the image; and
generating the output feature map based on the first feature map, the second feature map, and the third feature map.

18. The server of claim 17, wherein the instructions, when executed by the one or more processors individually or collectively, further cause the server to:
identify pixels, of the image in each of multi-channel image patches, at a same location in the multi-channel image patches;
obtain third vectors in which the pixels are linearly embedded; and
apply the third vectors to the third MLP.

19. The server of claim 17,
wherein the instructions, when executed by the one or more processors individually or collectively, further cause the server to:
identify pixels, of the image in each of multi-channel image patches, using a random sampling method, and
wherein the pixels are embedded as one unit vector.

20. One or more non-transitory computer-readable storage media storing one or more computer programs including computer-executed instructions that, when executed by one or more processors of a server individually or collectively, cause the server to perform computer vision operations for classifying an image by using an image classification model including a plurality of parallel multi-layer perceptron (MLP) layers sequentially connected to each other, the plurality of parallel MLP layers comprising an input parallel MLP layer, one or more hidden parallel MLP layers, and an output parallel MLP layer, each of the plurality of parallel MLP layers comprising a first MLP and a second MLP and dimensions of data before and after an operation of each of the plurality of parallel MLP layers are a same dimension by transforming an operation result of the first MLP to match a predefined original dimension, transforming an operation result of the second MLP to match the predefined original dimension, and then combining the transformed operation result of the first MLP with the transformed operation result of the second MLP to maintain the same dimension before and after the operation of each of the plurality of parallel MLP layers, the operations comprising:
generating, by the server, a plurality of image patches by splitting the image;
generating, by the server, first vectors for recognizing a local characteristic of each of the image patches;
generating, by the server, second vectors for recognizing a characteristic of a relationship between the image patches;
inputting, by the server, the first vectors into the first MLP in the input parallel MLP layer;
inputting, by the server, the second vectors into the second MLP in the input parallel MLP layer;
performing, by the server, an operation of the first MLP in the input parallel MLP layer and an operation of the second MLP in the input parallel MLP layer in parallel;
extracting, by the server, features related to the image by using the one or more hidden parallel MLP layers; and
outputting, by the server, a classification probability value of the image from the features related to the image by using the output parallel MLP layer.

* * * * *